(12) United States Patent
Lindsley et al.

(10) Patent No.: US 12,414,509 B2
(45) Date of Patent: Sep. 16, 2025

(54) APPARATUS, SYSTEM, AND METHOD FOR GROWING AND HARVESTING LIVING MATTER

(71) Applicant: FOREVER FEED TECHNOLOGIES, Hanford, CA (US)

(72) Inventors: Steven R. Lindsley, Alpine, UT (US); Nathan Bastow, Highland, UT (US); Jacob De Jong, Hanford, CA (US); W. Coulter Woodward, Springville, UT (US); Jason Jensen, Provo, UT (US)

(73) Assignee: FOREVER FEED TECHNOLOGIES, Hanford, CA (US)

( * ) Notice: Subject to any disclaimer, the term of this patent is extended or adjusted under 35 U.S.C. 154(b) by 0 days.

(21) Appl. No.: 18/669,398

(22) Filed: May 20, 2024

(65) Prior Publication Data

US 2024/0381816 A1   Nov. 21, 2024

Related U.S. Application Data

(60) Provisional application No. 63/601,432, filed on Nov. 21, 2023, provisional application No. 63/467,929, filed on May 20, 2023.

(51) Int. Cl.
*A01G 9/08* (2006.01)
*A01G 9/24* (2006.01)
(Continued)

(52) U.S. Cl.
CPC ............. *A01G 9/088* (2013.01); *A01G 9/085* (2013.01); *A01G 9/247* (2013.01); *A01G 9/249* (2019.05);
(Continued)

(58) Field of Classification Search
CPC ........ A01G 9/085; A01G 9/086; A01G 9/088; A01G 9/24; A01G 9/247; A01G 9/249;
(Continued)

(56) References Cited

U.S. PATENT DOCUMENTS 10,034,434 B2   7/2018   Millar
D855,120 S      7/2019   Millar et al.
(Continued)

FOREIGN PATENT DOCUMENTS

| CN | 113728758 | 12/2021 | | |
| WO | WO-2020030825 A1 | * | 2/2020 | ........... A01G 31/045 |
| WO | WO-2022084516 A1 | * | 4/2022 | .............. B25J 5/007 |

OTHER PUBLICATIONS

Invitation to Pay Additional Fees for International Patent Application No. PCT/US2024/030279 dated Aug. 15, 2024.
(Continued)

*Primary Examiner* — Peter M Poon
*Assistant Examiner* — Danielle A Clerkley
(74) *Attorney, Agent, or Firm* — Kunzler Bean & Adamson

(57) ABSTRACT

Disclosed herein is a system for growing and harvesting living matter. The system includes trays. The system also includes a racking portion, including at least one rack having shelves vertically spaced apart from each other and a robot selectively operable to deliver the trays to and retrieve the trays from the shelves. The system further includes a processing portion, including a harvester configured to receive the trays from the shelves and to remove living matter from the trays, and a seeder configured to receive the trays from the harvester and to distribute seed to the trays. The system additionally includes an electronic controller operable to autonomously control operation of the robot to deliver the trays, after seeded by the seeder, to the shelves and to
(Continued)

retrieve the trays, when the seed has grown into the living matter, from the shelves.

21 Claims, 18 Drawing Sheets

(51) Int. Cl.
*A01G 9/26* (2006.01)
*B65G 1/04* (2006.01)

(52) U.S. Cl.
CPC ............. *A01G 9/26* (2013.01); *B65G 1/0492* (2013.01); *B65G 2201/0258* (2013.01)

(58) Field of Classification Search
CPC ...... A01G 9/26; B65G 1/0407; B65G 1/0492; B65G 2201/0258
See application file for complete search history.

(56) References Cited

U.S. PATENT DOCUMENTS

| | | |
|---|---|---|
| D858,654 S | 9/2019 | Millar et al. |
| 10,421,618 B2 | 9/2019 | Millar et al. |
| D869,114 S | 12/2019 | Millar et al. |
| 10,492,375 B2 | 12/2019 | Millar |
| 10,568,275 B2 | 2/2020 | Millar et al. |
| 10,602,676 B2 | 3/2020 | Millar et al. |
| 10,681,880 B2 | 6/2020 | Millar |
| 10,709,073 B2 | 7/2020 | Millar |
| 10,757,870 B2 | 9/2020 | Millar et al. |
| 10,779,477 B2 | 9/2020 | Millar |
| 10,820,533 B2 | 11/2020 | Millar |
| 10,836,587 B2 | 11/2020 | Millar et al. |
| 10,842,085 B2 | 11/2020 | Millar |
| 10,866,886 B2 | 12/2020 | Millar |
| 10,897,856 B2 | 1/2021 | Millar et al. |
| D909,908 S | 2/2021 | Millar et al. |
| 10,905,052 B2 | 2/2021 | Millar |
| 10,905,058 B2 | 2/2021 | Millar et al. |
| 10,905,059 B2 | 2/2021 | Millar |
| 10,913,622 B2 | 2/2021 | Stott et al. |
| 10,918,031 B2 | 2/2021 | Millar et al. |
| 10,932,418 B2 | 3/2021 | Millar et al. |
| 10,952,381 B2 | 3/2021 | Millar |
| 10,973,178 B2 | 4/2021 | Millar et al. |
| 10,986,788 B2 | 4/2021 | Millar et al. |
| 10,999,973 B2 | 5/2021 | Millar et al. |
| 11,008,022 B2 | 5/2021 | Millar |
| 11,019,773 B2 | 6/2021 | Millar et al. |
| 11,026,373 B2 | 6/2021 | Millar et al. |
| 11,032,977 B2 | 6/2021 | Smith et al. |
| 11,058,067 B2 | 7/2021 | Broadbent |
| 11,067,524 B2 | 7/2021 | Millar |
| 11,071,266 B2 | 7/2021 | Millar et al. |
| 11,089,742 B2 | 8/2021 | Millar |
| 11,096,342 B2 | 8/2021 | Millar |
| 11,102,942 B2 | 8/2021 | Millar |
| 11,116,155 B2 | 9/2021 | Millar et al. |
| 11,126,542 B2 | 9/2021 | Millar |
| 11,134,626 B2 | 10/2021 | Millar et al. |
| 11,140,836 B2 | 10/2021 | Smith et al. |
| 11,154,016 B2 | 10/2021 | Millar et al. |
| 11,160,222 B2 | 11/2021 | Millar et al. |
| 11,172,622 B2 | 11/2021 | Millar et al. |
| 11,191,224 B2 | 12/2021 | Millar et al. |
| 11,202,416 B2 | 12/2021 | Millar |
| 11,206,768 B2 | 12/2021 | Millar et al. |
| 11,219,172 B2 | 1/2022 | Millar |
| 2018/0343810 A1 | 12/2018 | Counne |
| 2018/0359913 A1 | 12/2018 | Millar |
| 2018/0359915 A1 | 12/2018 | Millar |
| 2018/0359932 A1 | 12/2018 | Millar et al. |
| 2018/0359937 A1 | 12/2018 | Millar |
| 2018/0359944 A1 | 12/2018 | Millar et al. |
| 2018/0359949 A1 | 12/2018 | Millar et al. |
| 2018/0359950 A1 | 12/2018 | Millar et al. |
| 2018/0359951 A1 | 12/2018 | Millar |
| 2018/0359955 A1 | 12/2018 | Millar |
| 2018/0359957 A1 | 12/2018 | Millar et al. |
| 2018/0359970 A1 | 12/2018 | Millar et al. |
| 2018/0359975 A1 | 12/2018 | Millar et al. |
| 2018/0359976 A1 | 12/2018 | Millar et al. |
| 2018/0367614 A1 | 12/2018 | Millar |
| 2019/0307077 A1 | 10/2019 | Lert et al. |
| 2020/0000007 A1* | 1/2020 | Barrick ................... A01C 1/04 |
| 2020/0022316 A1 | 1/2020 | Millar et al. |
| 2020/0060097 A1 | 2/2020 | Millar |
| 2020/0077597 A1 | 3/2020 | Millar |
| 2020/0163283 A1* | 5/2020 | Aminpour ................ A01G 9/26 |
| 2020/0236838 A1 | 7/2020 | Smith |
| 2020/0236879 A1 | 7/2020 | Millar et al. |
| 2020/0236882 A1 | 7/2020 | Nielson et al. |
| 2020/0239050 A1 | 7/2020 | Millar et al. |
| 2020/0367445 A1 | 11/2020 | Millar |
| 2021/0127594 A1 | 5/2021 | Millar |
| 2021/0153445 A1 | 5/2021 | Millar et al. |
| 2021/0169014 A1 | 6/2021 | Millar |
| 2021/0267138 A1 | 9/2021 | Boudeman et al. |
| 2022/0015305 A1 | 1/2022 | Millar et al. |
| 2022/0053712 A1 | 2/2022 | Millar et al. |
| 2022/0087119 A1 | 3/2022 | Millar |
| 2022/0225579 A1* | 7/2022 | Robell ................... A01G 31/04 |
| 2022/0225588 A1 | 7/2022 | Cuson et al. |
| 2022/0304252 A1 | 9/2022 | Kaplita et al. |
| 2023/0105410 A1 | 4/2023 | Millar et al. |
| 2023/0143014 A1* | 5/2023 | Nguyen .................. G01W 1/10 |
| | | 47/17 |

OTHER PUBLICATIONS

International Search Report and Written Opinion concerning International Application No. PCT/US24/30279 dated Nov. 5, 2024.

* cited by examiner

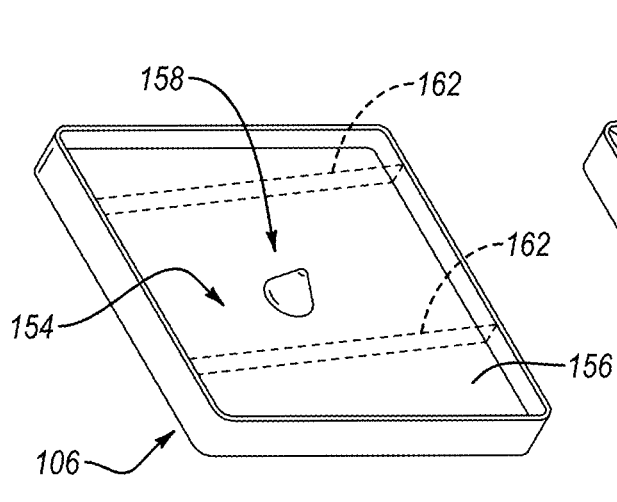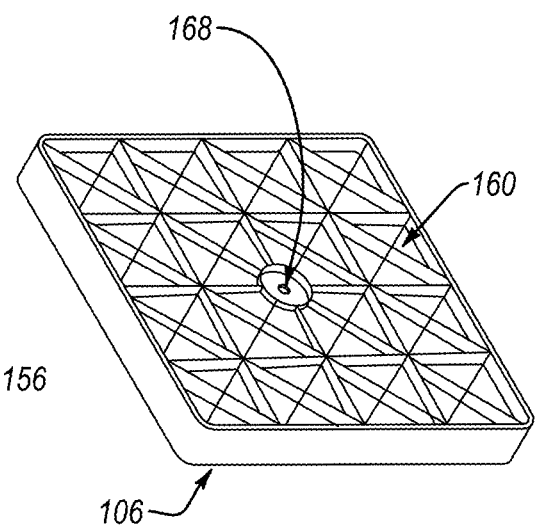
FIG. 9   FIG. 10
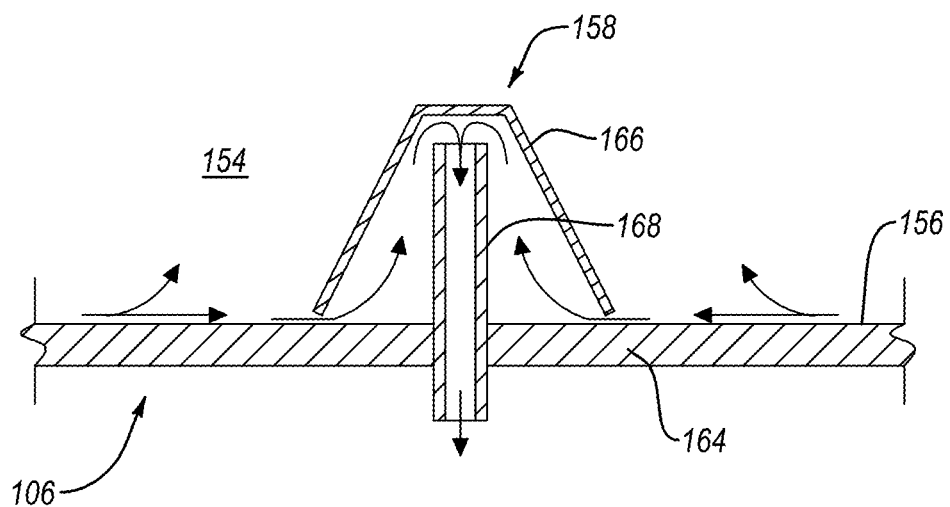
FIG. 11A

APPARATUS, SYSTEM, AND METHOD FOR GROWING AND HARVESTING LIVING MATTER

CROSS-REFERENCE TO RELATED APPLICATIONS

This application claims the benefit of U.S. Provisional Patent Application No. 63/467,929, filed May 20, 2023, and U.S. Provisional Patent Application No. 63/601,432, filed Nov. 21, 2023, which are incorporated herein by reference in their entireties.

FIELD

This disclosure relates generally to growing and harvesting living matter, and more particularly to growing and harvesting feed for animals in a closed climate-controlled environment.

BACKGROUND

Conventional methods for growing, harvesting, and distributing feed for animals includes growing and harvesting seed at one location, and distributing feed to animals at another remote location. The distribution of the feed commonly requires transportation of the feed over long distances. Additionally, feed for animals is conventionally grown outdoors in the ground.

SUMMARY

The subject matter of the present application has been developed in response to the present state of the art, and in particular, in response to the problems and needs of conventional systems and methods for growing, harvesting, and distributing living matter, including feed for animals. Because conventional methods for growing, harvesting, and distributing feed for animals include growing feed at one location and distributing the feed to animals at another remote location, the feed, upon arrival at the remote location, can lack freshness. Additionally, the quality and timing of the growth and harvesting of the feed grown outdoors is dependent on unpredictable environmental factors, such as the weather. Also, growing feed outdoors in the ground makes inefficient use of the area in which the feed is planted and grown. Finally, conventional methods for growing, harvesting, and distributing feed for animals can require considerable labor and square footage, and thus is not easily scalable. In view of the foregoing, the subject matter of the present application has been developed to provide an apparatuses, systems, and methods for growing, harvesting, and distributing living matter, such as feed for animals, that overcome many of the shortcomings of the prior art.

The following is a non-exhaustive list of examples, which may or may not be claimed, of the subject matter, disclosed herein.

Disclosed herein is a system for growing and harvesting living matter. The system includes trays. The system also includes a racking portion, including at least one rack having shelves vertically spaced apart from each other and a robot selectively operable to deliver the trays to and retrieve the trays from the shelves. The system further includes a processing portion, including a harvester configured to receive the trays from the shelves and to remove living matter from the trays and a seeder configured to receive the trays from the harvester and to distribute seed to the trays. The system additionally includes an electronic controller operable to autonomously control operation of the robot to deliver the trays, after seeded by the seeder, to the shelves and to retrieve the trays, after the seed has grown into the living matter, from the shelves. The preceding subject matter of this paragraph characterizes example 1 of the present disclosure.

The racking portion includes two racks separated by an aisle. The robot is selectively movable along the aisle to deliver the trays to and retrieve the trays from the shelves of either of the two racks at any of various locations along the aisle. The preceding subject matter of this paragraph characterizes example 2 of the present disclosure, wherein example 2 also includes the subject matter according to example 1, above.

The robot is selectively operable to vertically raise or lower the trays, to deliver the trays to and retrieve the trays from any one of the shelves, and to horizontally move the trays, to deliver the trays to and retrieve the trays from any one of multiple tray storage positions along the shelves. The preceding subject matter of this paragraph characterizes example 3 of the present disclosure, wherein example 3 also includes the subject matter according to any of examples 1-2, above.

The robot includes an automated storage and retrieval system (ASRS) robot. The preceding subject matter of this paragraph characterizes example 4 of the present disclosure, wherein example 4 also includes the subject matter according to any of examples 1-3, above.

The processing portion further includes a conveyor selectively operable to convey the trays. The harvester is configured to receive the trays from the shelves via the conveyor. The seeder is configured to receive the trays from the harvester via the conveyor. The electronic controller is operable to autonomously control operation of the conveyor to convey the trays from the robot to the harvester, from the harvester to the seeder, and from the seeder to the robot. The preceding subject matter of this paragraph characterizes example 5 of the present disclosure, wherein example 5 also includes the subject matter according to any of examples 1-4, above.

The processing portion further includes a cleaner configured to receive the trays from the harvester via the conveyor. The seeder is configured to receive the trays from cleaner via the conveyor. The electronic controller is operable to autonomously control operation of the conveyor to convey the trays from the harvester to the cleaner and to convey the trays from the cleaner to the seeder. The preceding subject matter of this paragraph characterizes example 6 of the present disclosure, wherein example 6 also includes the subject matter according to example 5, above.

The robot delivers each one of the trays to a corresponding one of multiple tray storage positions on the shelves and retrieves each one of the trays from the corresponding one of the multiple tray storage positions on the shelves. The preceding subject matter of this paragraph characterizes example 7 of the present disclosure, wherein example 7 also includes the subject matter according to any of examples 1-6, above.

The racking portion includes a watering system, including water inlet lines each associated with a corresponding one of the multiple tray storage positions to deliver water to a corresponding one of the trays in the corresponding one of the multiple tray storage positions. The preceding subject matter of this paragraph characterizes example 8 of the present disclosure, wherein example 8 also includes the subject matter according to example 7, above.

The racking portion includes a drainage system, including drainage lines each associated with a corresponding one of the multiple tray storage positions to drain water from a corresponding one of the trays in the corresponding one of the multiple tray storage positions. The preceding subject matter of this paragraph characterizes example 9 of the present disclosure, wherein example 9 also includes the subject matter according to example 7, above.

Each one of the trays includes a passive drainage device configured to drain water from the tray to the drainage line associated with the tray storage position in which the tray is positioned. The preceding subject matter of this paragraph characterizes example 10 of the present disclosure, wherein example 10 also includes the subject matter according to example 9, above.

The racking portion includes a lighting system, including light sources each associated with a corresponding one of the multiple tray storage positions to shine light onto a corresponding one of the trays in the corresponding one of the multiple tray storage positions. The preceding subject matter of this paragraph characterizes example 11 of the present disclosure, wherein example 11 also includes the subject matter according to any of examples 8-10, above.

The racking portion includes a watering system, including a water inlet line associated with a vertical grouping of trays to deliver water to only an uppermost tray of the vertical grouping of trays. The preceding subject matter of this paragraph characterizes example 12 of the present disclosure, wherein example 12 also includes the subject matter according to any of examples 7-11, above.

Each one of the trays includes a passive drainage device configured to drain water from the tray. The watering system further includes a drainage system, including a drainage line in fluidic communication with the passive drainage device of a lowermost tray of the vertical grouping of trays. The passive drainage device of the trays of the vertical grouping of trays, except for the lowermost tray of the vertical grouping of trays, is configured to drain water from a corresponding one of the trays to a corresponding adjacent one of the trays below the corresponding one of the trays. The preceding subject matter of this paragraph characterizes example 13 of the present disclosure, wherein example 13 also includes the subject matter according to example 12, above.

The racking portion includes a watering system. The trays are grouped into a first grouping of trays and a second grouping of trays vertically offset from the first grouping of trays. The electronic controller is configured to deliver water to the first grouping of trays according to a first watering program and to deliver water to the second grouping of trays according to a second watering program that is different than the first watering program. The preceding subject matter of this paragraph characterizes example 14 of the present disclosure, wherein example 14 also includes the subject matter according to any of examples 7-13, above.

The system includes multiple racking portions and multiple processing portions. The system further includes multiple sub-systems. Each one of the sub-systems includes a corresponding one of the racking portions and a corresponding one of the processing portions. The preceding subject matter of this paragraph characterizes example 15 of the present disclosure, wherein example 15 also includes the subject matter according to any of examples 1-14, above.

The system further includes a single feed conveyor configured to receive the living matter, removed from the trays, from all the harvesters of the sub-systems. The preceding subject matter of this paragraph characterizes example 16 of the present disclosure, wherein example 16 also includes the subject matter according to example 15, above.

The racking portion incudes two racks. The shelves of the two racks are configured to store at least 3,840 trays at one time. The preceding subject matter of this paragraph characterizes example 17 of the present disclosure, wherein example 17 also includes the subject matter according to any of examples 1-16, above.

Each one of the shelves of the racking portion is configured to store the trays in a two-deep configuration. The preceding subject matter of this paragraph characterizes example 18 of the present disclosure, wherein example 18 also includes the subject matter according to any of examples 1-17, above.

The system further includes an enclosed structure. The trays, the racking portion, and the processing portion are located within the enclosed structure. The preceding subject matter of this paragraph characterizes example 19 of the present disclosure, wherein example 19 also includes the subject matter according to any of examples 1-18, above.

The system further includes a mister between the seeder and the at least one rack. The mister is configured to mist the seed in the trays with water before the robot delivers the trays to the shelves. The preceding subject matter of this paragraph characterizes example 20 of the present disclosure, wherein example 20 also includes the subject matter according to any of examples 1-19, above.

Further disclosed herein is a method of autonomously growing and harvesting living matter. The method includes seeding trays with seed to form seeded trays. The method also includes delivering the seeded trays onto shelves of at least one rack via a robot such that each one of the seeded trays is vertically spaced apart from at least one other one of the seeded trays. The method further includes watering and draining water from the seeded trays when the seeded trays are on the shelves to grow the seed into living matter and form feed-ready trays. The method additionally includes retrieving the feed-ready trays from the shelves via the robot. The method also includes removing the living matter from the feed-ready trays to form clean-empty trays. The method further includes reseeding the clean-empty trays with seed to re-form the seeded trays. The preceding subject matter of this paragraph characterizes example 21 of the present disclosure.

During a harvesting period, the robot continuously alternates between delivering at least one of the seeded trays onto the shelves and retrieving at least one of the feed-ready trays from the shelves. The preceding subject matter of this paragraph characterizes example 22 of the present disclosure, wherein example 22 also includes the subject matter according to example 21, above.

During the harvesting period, the robot continuously alternates between delivering at least two of the seeded trays onto the shelves and retrieving at least two of the feed-ready trays from the shelves. The preceding subject matter of this paragraph characterizes example 23 of the present disclosure, wherein example 23 also includes the subject matter according to example 22, above.

The method further includes conveying, via an automated conveyor, the feed-ready trays to a harvester that removes the living matter from the feed-ready trays, and conveying, via the automated conveyor, the clean-empty trays to a seeder that re-seeds the clean-empty trays. One of the feed-ready trays is conveyed to the harvester and one of the clean-empty trays is conveyed to the seeder concurrently with at least one of the seeded trays being delivered to or at least one of the feed-ready trays being retrieved. The preceding subject matter of this paragraph characterizes example 24 of the present disclosure, wherein example 24 also includes the subject matter according to any of examples 21-23, above.

Each one of the seeded trays remains in the same tray storage position on one of the shelves when watered and drained. The preceding subject matter of this paragraph characterizes example 25 of the present disclosure, wherein example 25 also includes the subject matter according to any of examples 21-24, above.

The shelves of the at least one rack include multiple sets of shelves. All the feed-ready trays on the shelves of a first one of the multiple sets of shelves are retrieved from the shelves of the first one of the multiple sets of shelves and replaced with seeded trays before any of the feed-ready trays on the shelves of a second one of the multiple sets of shelves are retrieved from the shelves of the second one of the multiple sets of shelves and replaced with seeded trays. The preceding subject matter of this paragraph characterizes example 26 of the present disclosure, wherein example 26 also includes the subject matter according to any of examples 21-25, above.

Seeding the trays, delivering the seeded trays, individually watering, shining artificial light on, and draining water from the seeded trays, retrieving the feed-ready trays, removing the living matter from the feed-ready trays, and reseeding the clean-empty trays is performed autonomously without manual intervention. The preceding subject matter of this paragraph characterizes example 27 of the present disclosure, wherein example 27 also includes the subject matter according to any of examples 21-26, above.

The seeded trays are delivered onto the shelves and the feed-ready trays are retrieved from the shelves at a rate of at least 84 trays per hour per rack. The preceding subject matter of this paragraph characterizes example 28 of the present disclosure, wherein example 28 also includes the subject matter according to any of examples 21-27, above.

The seeded trays are delivered onto the shelves and the feed-ready trays are retrieved from the shelves at a rate of at least 168 trays per hour per rack. The preceding subject matter of this paragraph characterizes example 29 of the present disclosure, wherein example 29 also includes the subject matter according to any of examples 21-28, above.

Additionally disclosed herein is a tray for growing and harvesting living matter. The tray includes an open top, closed sides, and a closed bottom. The tray also includes an interior cavity defined by the closed sides and the closed bottom. The tray further includes a siphon drain formed in the closed bottom. The siphon drain includes a domed housing, vertically offset from the closed bottom such that a gap is defined between the domed housing and the closed bottom, and a stand pipe within the domed housing, extending through the closed bottom, having an upper opening within the domed housing, and having a lower opening below the closed bottom. The preceding subject matter of this paragraph characterizes example 30 of the present disclosure.

The closed bottom includes a grow surface and a reservoir formed in, at least partially open to, and located below the grow surface such that fluid in the tray is flowable into the reservoir from the grow surface. The preceding subject matter of this paragraph characterizes example 31 of the present disclosure, wherein example 31 also includes the subject matter according to example 30, above.

The reservoir is at least partially open to the grow surface via an aperture formed in the grow surface. The siphon drain extends through the aperture. The preceding subject matter of this paragraph characterizes example 32 of the present disclosure, wherein example 32 also includes the subject matter according to example 31, above.

The tray further includes a grate positioned in the aperture and configured to allow fluid to pass through to the reservoir and to prevent seed from passing through to the reservoir. The preceding subject matter of this paragraph characterizes example 33 of the present disclosure, wherein example 33 also includes the subject matter according to example 32, above.

The grate includes a plurality of apertures each having a size smaller than any one of the seed. The preceding subject matter of this paragraph characterizes example 34 of the present disclosure, wherein example 34 also includes the subject matter according to example 33, above.

The closed bottom includes a weep hole formed in a bottom surface of the reservoir. The preceding subject matter of this paragraph characterizes example 35 of the present disclosure, wherein example 35 also includes the subject matter according to any of examples 31-34, above.

The domed housing is vertically offset from a bottom surface of the reservoir formed in the grow surface. The preceding subject matter of this paragraph characterizes example 36 of the present disclosure, wherein example 36 also includes the subject matter according to any of examples 31-35, above.

The dome housing includes an open end and a closed end, opposite the open end. The open end defines the gap. The closed end is higher than the open end. The preceding subject matter of this paragraph characterizes example 37 of the present disclosure, wherein example 37 also includes the subject matter according to any of examples 30-36, above.

The domed housing is coaxial with the stand pipe. The preceding subject matter of this paragraph characterizes example 38 of the present disclosure, wherein example 38 also includes the subject matter according to any of examples 30-37, above.

The domed housing has a generally conical shape. The preceding subject matter of this paragraph characterizes example 39 of the present disclosure, wherein example 39 also includes the subject matter according to any of examples 30-38, above.

The domed housing has a generally cylindrical shape. The preceding subject matter of this paragraph characterizes example 40 of the present disclosure, wherein example 40 also includes the subject matter according to any of examples 30-39, above.

The closed bottom is downwardly sloped toward the siphon drain. The preceding subject matter of this paragraph characterizes example 41 of the present disclosure, wherein example 41 also includes the subject matter according to any of examples 30-40, above.

The tray further includes at least one partition coupled to the closed bottom and dividing the interior cavity into multiple sections. The preceding subject matter of this paragraph characterizes example 42 of the present disclosure, wherein example 42 also includes the subject matter according to any of examples 30-41, above.

The upper opening of the stand pipe is located at a height above the bottom surface. The height is equal to a maximum fill height of water in the tray. The preceding subject matter of this paragraph characterizes example 43 of the present disclosure, wherein example 43 also includes the subject matter according to any of examples 30-42, above.

The closed sides form a square, such that the interior cavity has a square shape. The preceding subject matter of this paragraph characterizes example 44 of the present disclosure, wherein example 44 also includes the subject matter according to any of examples 30-43, above.

At least one of each one of at least two opposite ones of the sides includes side slots, and the closed bottom includes bottom slots. The preceding subject matter of this paragraph characterizes example 45 of the present disclosure, wherein example 45 also includes the subject matter according to any of examples 30-44, above.

Also disclosed herein is a gravity-fed seeder for delivering seed to a tray. The gravity-fed seeder includes a hopper. The gravity-fed seeder also includes a valved neck selectively operable between an open state and a closed state. The gravity-fed seeder further includes a baffle system in seed receiving communication with the valved neck so that when the valved neck is in the open state, seed from the hopper is gravity-fed into the baffle system, and when the valve neck is in the closed state, seed is prevented from being gravity-fed into the baffle system. The baffle system includes a housing that diverges from the valved neck and a plurality of sets of dividers within the housing. Each one of the plurality of sets of dividers includes dividers that are horizontal, are parallel to each other to define gaps between adjacent dividers, and span an entire cross-sectional area of the housing. The preceding subject matter of this paragraph characterizes example 46 of the present disclosure.

Further disclosed herein is a gravity-fed seeder for delivering seed to a tray. The gravity-fed seeder includes a hopper. The gravity-fed seeder also includes a sifting system in seed receiving communication with the hopper so that seed in the hopper is gravity-fed onto the sifting system. The sifting system includes a perforated base plate including multiple apertures. The sifting system also includes a perforated sifting plate movable relative to the perforated base plate including a top portion and a bottom portion. The perforated base plate is interposed between the top portion and the bottom portion, and each of the top portion and the bottom portion includes multiple openings, the openings of the top portion being staggered relative to the openings of the bottom portion. The preceding subject matter of this paragraph characterizes example 47 of the present disclosure.

Additionally disclosed herein is a gravity-fed seeder for delivering seed to a tray. The gravity-fed seeder includes a primary hopper. The gravity-fed seeder also includes primary chutes in seed receiving communication with the primary hopper and angled laterally outwardly away from the primary hopper. The gravity-fed seeder further includes secondary hoppers each in seed receiving communication with a corresponding one of the primary chutes. The gravity-fed seeder additionally includes sets of secondary chutes. Each set of secondary chutes is in seed receiving communication with a corresponding one of the secondary hoppers and the secondary chutes of each one of the sets of secondary chutes is angled laterally outwardly away from the corresponding one of the secondary hoppers. The preceding subject matter of this paragraph characterizes example 48 of the present disclosure.

The primary hopper is centrally located, relative to the tray, when the gravity-feed seeder delivers seed to the tray. The preceding subject matter of this paragraph characterizes example 49 of the present disclosure, wherein example 49 also includes the subject matter according to example 48, above.

A maximum cross-sectional area of the primary hopper is less than a maximum area of the tray. The preceding subject matter of this paragraph characterizes example 50 of the present disclosure, wherein example 50 also includes the subject matter according to any of examples 48-49, above.

The gravity-fed seeder includes at least four primary chutes and at least four secondary hoppers. The preceding subject matter of this paragraph characterizes example 51 of the present disclosure, wherein example 51 also includes the subject matter according to any of examples 48-50, above.

Each one of the sets of secondary chutes includes at least four secondary chutes such that the gravity-fed seeder includes at least sixteen secondary chutes. The preceding subject matter of this paragraph characterizes example 52 of the present disclosure, wherein example 52 also includes the subject matter according to example 51, above.

A maximum cross-sectional area of each one of the secondary hoppers is smaller than a maximum-cross sectional area of the primary hopper. The preceding subject matter of this paragraph characterizes example 53 of the present disclosure, wherein example 53 also includes the subject matter according to any of examples 48-52, above.

The primary chutes and the secondary hoppers are equidistantly spaced about an outlet of the primary hopper. The preceding subject matter of this paragraph characterizes example 54 of the present disclosure, wherein example 54 also includes the subject matter according to any of examples 48-53, above.

The secondary chutes of each set of secondary chutes are equidistantly spaced about an outlet of the corresponding one of the secondary hoppers. The preceding subject matter of this paragraph characterizes example 55 of the present disclosure, wherein example 55 also includes the subject matter according to any of examples 48-54, above.

The gravity-fed seeder further includes tertiary hoppers, each in seed receiving communication with a corresponding one of the secondary chutes, and sets of tertiary chutes. Each set of tertiary chutes is in seed receiving communication with a corresponding one of the tertiary hoppers and the tertiary chutes of each one of the sets of tertiary chutes is angled laterally outwardly away from the corresponding one of the tertiary hoppers. The preceding subject matter of this paragraph characterizes example 56 of the present disclosure, wherein example 56 also includes the subject matter according to any of examples 48-55, above.

A maximum cross-sectional area of each one of the tertiary hoppers is smaller than a maximum-cross sectional area of the corresponding one of the secondary hoppers. The preceding subject matter of this paragraph characterizes example 57 of the present disclosure, wherein example 57 also includes the subject matter according to example 56 above.

The gravity-fed seeder includes at least four primary chutes and at least four secondary hoppers. Each one of the sets of secondary chutes includes at least four secondary chutes such that the gravity-fed seeder includes at least sixteen secondary chutes. The gravity-fed seeder includes at least sixteen tertiary hoppers. Each one of the sets of tertiary chutes includes at least four tertiary chutes such that the gravity-fed seeder includes at least sixty-four tertiary chutes. The preceding subject matter of this paragraph characterizes example 58 of the present disclosure, wherein example 58 also includes the subject matter according to any of examples 56-57, above.

The tertiary chutes of each set of tertiary chutes are equidistantly spaced about an outlet of the corresponding one of the tertiary hoppers. The preceding subject matter of this paragraph characterizes example 59 of the present disclosure, wherein example 59 also includes the subject matter according to any of examples 56-58, above.

The gravity-fed seeder further includes a seeding grate directly below the sets of tertiary chutes and in seed receiving communication directly with the sets of tertiary chutes. The preceding subject matter of this paragraph characterizes example 60 of the present disclosure, wherein example 60 also includes the subject matter according to any of examples 56-59, above.

The gravity-fed seeder further includes a seeding grate below the sets of secondary chutes and in seed receiving communication with the sets of secondary chutes. The preceding subject matter of this paragraph characterizes example 61 of the present disclosure, wherein example 61 also includes the subject matter according to any of examples 48-60, above.

The gravity-fed seeder includes at least two seeding grates below the sets of secondary chutes. The at least two seeding grates vertically overlap with each other such that seed passing through one of the at least two seeding grates is received by another one of the at least two seeding grates. The preceding subject matter of this paragraph characterizes example 62 of the present disclosure, wherein example 62 also includes the subject matter according to example 61, above.

The gravity-fed seeder further includes a housing that houses the primary hopper, the primary chutes, the secondary hoppers, and the sets of secondary chutes. The preceding subject matter of this paragraph characterizes example 63 of the present disclosure, wherein example 63 also includes the subject matter according to any of examples 48-62, above.

The housing includes an upper opening and a lower opening. The upper opening has the same size and shape as an inlet of the primary hopper. The lower opening has the same size and shape as the tray. The preceding subject matter of this paragraph characterizes example 64 of the present disclosure, wherein example 64 also includes the subject matter according to example 63, above.

The housing has a quadrilateral cross-sectional shape. The preceding subject matter of this paragraph characterizes example 65 of the present disclosure, wherein example 65 also includes the subject matter according to any of examples 63-64, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended numbered paragraphs, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which:

FIG. 9 is a perspective view of a tray of a system for growing and harvesting living matter, showing the tray from a top of the tray, according to one or more examples of the present disclosure;

FIG. 10 is a perspective view of the tray of FIG. 9, showing the tray from a bottom of the tray, according to one or more examples of the present disclosure;

FIG. 11A is a cross-sectional side elevation view of the tray of FIG. 9, taken along the line 11A-11A of FIG. 9, according to one or more examples of the present disclosure;

DETAILED DESCRIPTION

Figure 1:
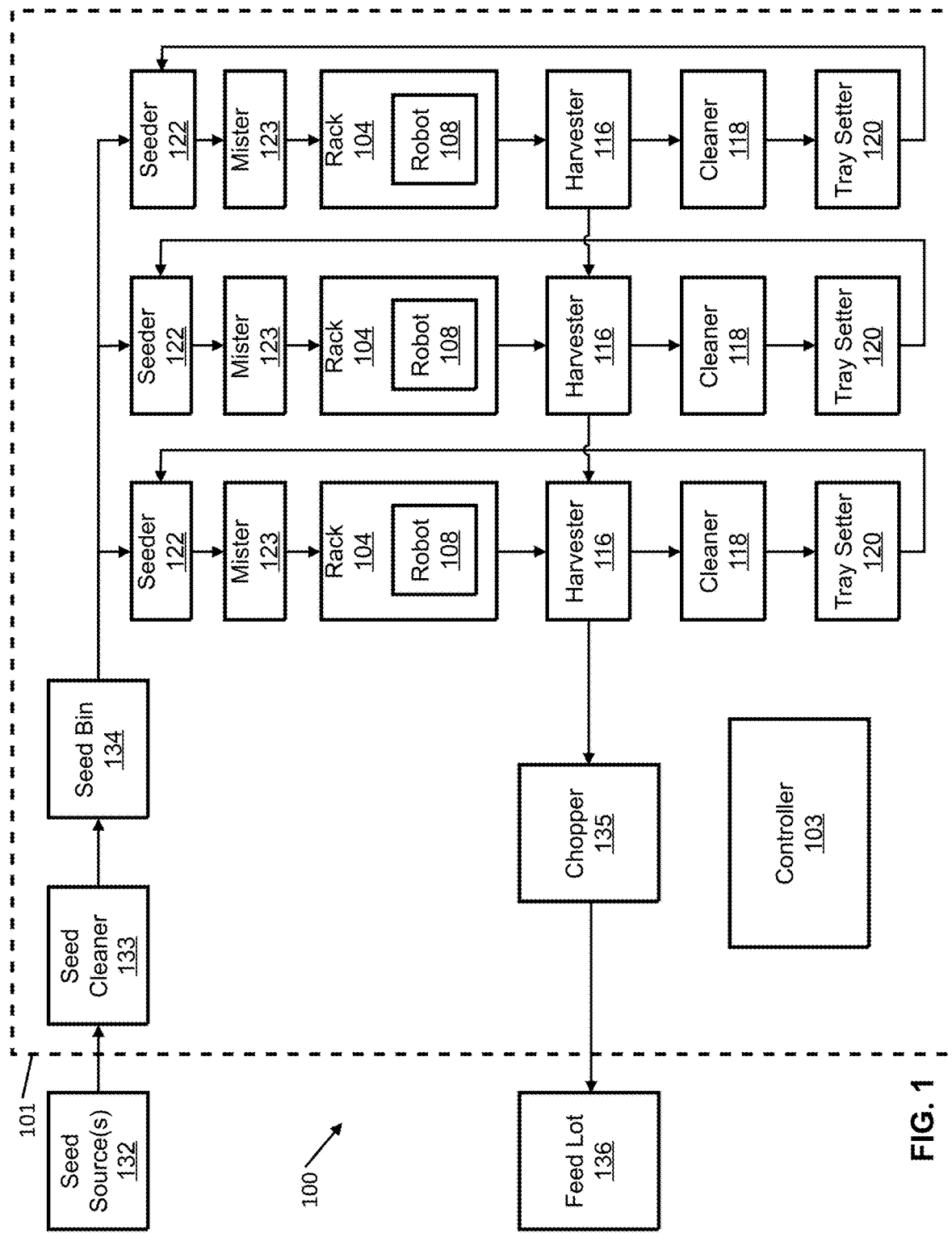
FIG. 1 is a schematic block diagram of a system for growing and harvesting living matter, according to one or more examples of the present disclosure.

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Described herein are examples of apparatuses, systems, and methods for growing, harvesting, and distributing living matter, such as feed for animals, that overcomes the above-mentioned shortcomings of conventional techniques. Examples of the present disclosure utilize automation and indoor growing techniques to promote predictability, efficiency, scalability, and feed freshness. The examples of the systems and methods described herein enable growing, harvesting, and distributing feed onsite where the animals are located, which promotes freshness of the feed. Also, examples of the systems and methods can eliminate labor and utilize the vertical space above and/or below the ground for growing feed, which promotes efficiency and scalability. Furthermore, the systems and methods described herein are respectively located and performed indoors in a controlled environment, which provides predictability and continuous year-round feed production. It is recognized that although the below examples are described in association with growing and harvesting feed for animals, the systems, apparatuses, and methods disclosed herein can be used to grow and harvest any of various types of living matter for any of various purposes. The living matter grown and harvested from seed, according to the examples disclosed herein, can be plants or animals. For example, in some implementations, the living matter includes fully-formed or recently sprouted plants, such as plants typically fed to certain types of animals, like cattle. Although there is no limitation to the types and varieties of plants that can be grown, harvested, and distributed using the apparatuses, systems, and methods described herein, in some examples, the plants can include fully-formed or recently sprouted wheatgrass, alfalfa, broccoli, wheat, buckwheat, chickpeas, lentils, *quinoa*, soybeans, sunflower, barley, rice, triticale, corn, peas, alfalfa, flax, and/or beans. In another example, the living matter includes animals, such as insect larvae for feeding to certain other types of animals, like chickens. When the living matter is plants, the seed is conventional seed associated with the development into a plant. However, when the living matter is an animal, such as an insect, the seed is eggs. Accordingly, as used herein, seeds can include conventional plant seed or animal eggs. Also, as used herein, the term "seed" refers to multiple seeds or a quantity of seeds, unless otherwise noted.

Referring to FIG. 1, according to one example, a schematic block diagram of a system 100 for growing and harvesting living matter, such as animal feed, is shown. The remainder of the disclosure will reference apparatuses, systems, and methods for growing and harvesting animal feed. However, it is recognized, that unless otherwise noted, the apparatuses, systems, and methods disclosed herein can be used to grow and harvest any of various living matter, other than animal feed. Accordingly, when used, animal feed can be interchangeable with living matter. The system 100 includes a seed source 132 and a feed lot 136. The seed source 132 can be one or more containers (e.g., silos) in which seed is stored or contained. The feed lot 136 is the location where animals are fed. In certain examples, the system 100 is contained in one location, which can be a location where animals to be fed are located. Accordingly, in certain examples, the seed source 132 and the feed lot 136 are on the same property. The system 100 also includes an enclosed structure 101, which houses other features of the system 100 in an indoor environment. Although not shown, the enclosed structure 101 can include environmental control systems, such as an HVAC system, that regulate environmental conditions (e.g., temperature, humidity, etc.) within the enclosed structure 101. In one example, the enclosed structure 101 is a permanent building, such as a warehouse, having a roof and sidewalls that enclose the indoor features of the system 100. However, in other examples, the enclosed structure 101 is a mobile structure, such as a trailer, that can be moved between and operated in different locations. Although the seed source 132 and the feed lot 136 are shown outside the enclosed structure 101, in some examples, the seed source 132 and the feed lot 136 can be located inside the enclosed structure 101. Additionally, although shown as a single box in FIG. 1, the seed source 132 can include multiple, separate containers each containing the same type of seed, or alternatively, each containing a different type of seed from one another.

In certain examples, the system 100 additionally includes a seed cleaner 133 and a seed bin 134. The seed cleaner 133 receives seed from the seed source 132 and cleans the seed prior to advancing the seed to the seed bin 134. The seed cleaner 133 can receive the same type of seed from one or more seed sources, or can alternatingly receive different type of seed from different seed sources. In this manner, the system 100 can be configured to grow the same type of feed or different types of feed depending on the type of seed received. As one example, and merely for illustrative purposes only, one rack 104 can be designated to grow one type of feed (e.g., corn) and another rack 104 can be designated to grow another type of feed (e.g., peas). According to some examples, the seed cleaner 133 includes any of various seed cleaning machines known in the art. The seed bin 134 includes a container (e.g., hopper) capable of retaining and temporarily storing the seed. In some examples, a seed conveyor, such as an auger conveyor, a conveyor belt, tubular cable conveyor, and/or the like, is utilized to help convey seed from the seed source 132 to the seed cleaner 133, and from the seed cleaner 133 to the seed bin 134. It is recognized that the seed conveyed by the conveyor can include only seed, or can also include other materials, such as fertilizer that will aid in the growth of the seed.

Figure 2:
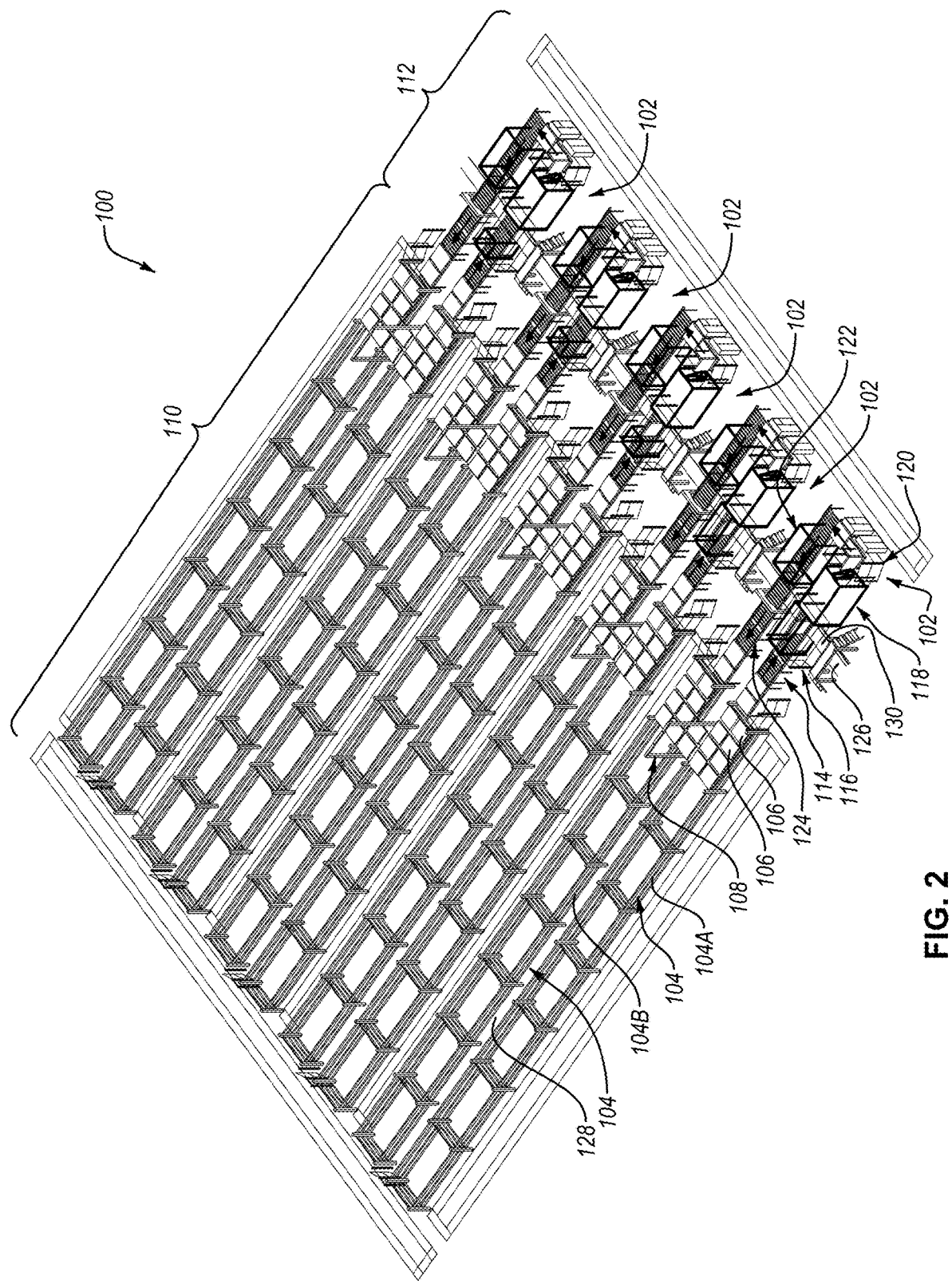
FIG. 2 is a perspective view of a system for growing and harvesting living matter, according to one or more examples of the present disclosure.
Figure 3:
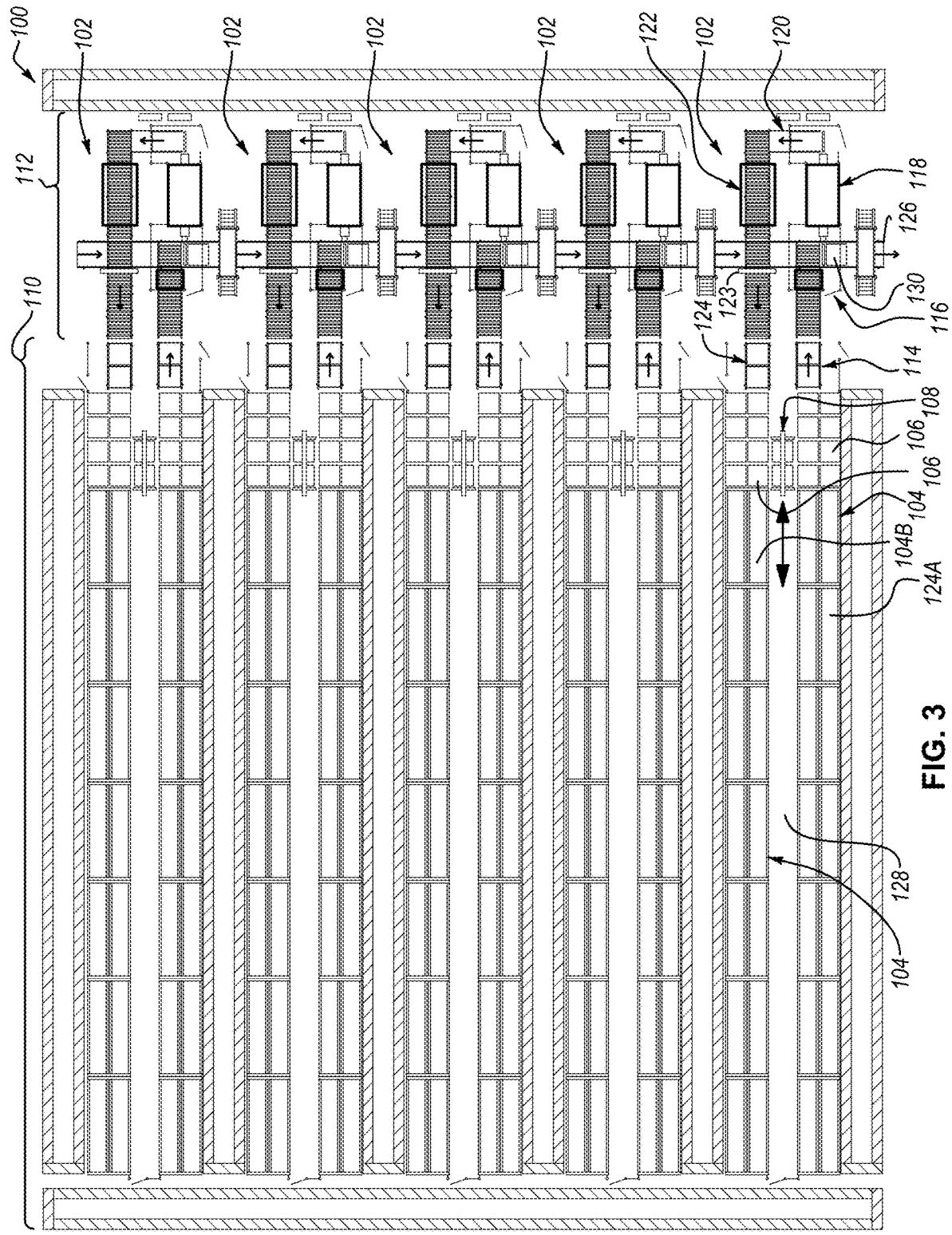
FIG. 3 is a top plan view of the system of FIG. 2, according to one or more examples of the present disclosure.

The system 100 additionally includes a seeder 122 that receives seed from the seed bin 134. As shown, in some examples, the system 100 includes multiple seeders 122 that receive seed from the seed bin 134. Another one or more seed conveyors can be used to move seed from the seed bin 134 to the seeder 122 or seeders 122. The seeder 122, or each one of the seeders 122, is configured to distribute seed into a tray 106 (see, e.g., FIG. 2). The tray 106 is configured to receive and retain seed, receive and retain water, and to retain the living matter that grow from the seed. Accordingly, the tray 106 can be any object or vessel capable of containing and retaining seed, water, and living matter. In certain examples, the tray 106 is rigid and has sidewalls that define an open interior cavity. The tray 106 can be made of any of various rigid materials, such as hardened plastic, metal, and/or the like. The tray 106 can be symmetrical (e.g., square) in some examples, such that the tray 106 can be processed through the system 100 in various orientations.

After the tray 106 is at least partially filled with seed from one of the seeders 122, in certain examples, the seeded tray is moved onto a shelf of a rack 104 by a robot 108. However, according to some examples, before the tray 106 with seed is moved onto the rack 104, the seeds of the tray 106 can be misted with water by a mister 123. The misted water interacts with the seed in the tray 106 to lightly moisturize and help settle the seed. Settling of the seed via the mist of water helps maintain a uniform distribution of seed in the tray 106 by preventing the seeds from clumping together in separated groups of seeds. According to some examples, the water misted onto the seeds of the tray 106 can be nutrient-enriched water. In other words, the water misted onto the seeds can have nutrients or supplements (e.g., $O_2$) added to water to help promote growth, taste, or nutritional value of the seed.

After trays are filled with seed, and after being misted with water by a mister, or a corresponding one of multiple misters, in certain examples having multiple seeders 122, the tray from each one of the seeders 122 is moved onto a shelf of a corresponding one of multiple racks 104. When on the shelf of the rack 104, a watering system of the rack 104 is operable to add water to the seeded tray. Additionally, after a designated period of time sufficient to promote growth of seedling from the seed, in some examples, a lighting system 173 of the rack 104 shines light on the seedling of the seeded tray to facilitate further growth of the seedling into fully-grown feed (see, e.g., FIG. 12A).

In some examples described in this paragraph, the tray containing the fully-grown feed is moved from the rack 104, by the robot 108, to a harvester 116 of the system 100. The harvester 116 is configured to remove the feed (e.g., feed 130) from the tray 106 and to deposit the feed 130 onto a feed conveyor 126. In some examples having multiple seeders 122 and multiple racks 104, the feed from each one of the trays is deposited onto the feed conveyor by one of multiple harvesters 116. Accordingly, in some examples, the feed 130 from the trays removed from multiple racks 104 is deposited by multiple harvesters 116 onto the same feed conveyor. If further processing of the feed 130 is desired, the feed on the conveyor can be fed to a chopper 135 of the system 100, which is configured to chop, shred, or otherwise process the feed into finer bits. The chopped feed is then fed, such as by a conveyor, to the feed lot 136. From the feed lot 136, the feed is delivered to animals for consumption.

In some examples described in this paragraph, after the feed 130 is removed from a tray, the tray is fed, such as via a conveyor, through a cleaner 118 of the system 100. The cleaner 118 is configured to remove any further debris from the tray that was not removed by the harvester 116. In some examples having multiple harvesters 116, the trays from each one of the harvesters 116 is fed through a corresponding one of multiple cleaners 118. The cleaner 118 can be any of various types of object cleaners known in the art, such as industrial dishwashers and/or the like. After a tray is cleaned, it can be conveyed, via a conveyor, to a tray setter 120, which is configured to position and/or orient the tray for reception of seed. When in the proper position and/or orientation, the tray is moved to the seeder 122 to receive seed. In certain examples having multiple harvesters 116 and seeders 122, the trays from each one of the harvesters is fed to a corresponding one of multiple tray setters 120 and then to a corresponding one of the multiple seeders 122 to receive feed, and the steps of the process are repeated.

The system 100 includes an electronic controller 103 in electrical communication with one or more electronically-controlled features of the system 100 to control operation of the features. For example, the electronic controller 103 can control operation of the various conveyors of the system 100 so that they are synchronized to autonomously move seed and trays through the system 100. Additionally, the electronic controller 103 can control movement of the robots 108 of the racks 104 of the system 100 to ensure the seeded trays are properly positioned on shelves of the racks 104 and properly removed from a rack 104 after the seeds have sufficiently matured into feed. The electronic controller 103 can also control operation of the seed cleaner 133, the seeders 122, the harvesters 116, the chopper 135, the cleaners 118, and/or the tray setters 120 so that the seed and trays are moved in an autonomous and synchronous manner according to a desired rate. According to certain examples, the seed and trays are continuously moved through the system 100 over a designated period of time, such as during the day or when animals are awake, so that fresh feed is continuously harvested and ready for consumption by the animals.

Referring now to FIGS. 2-5, perspective and top plan views of one example of the system 100 are shown. The system 100 in this example includes multiple sub-systems 102. Each one of the sub-systems 102 includes a racking portion 110 and a processing portion 112. The racking portions 110 of the sub-systems 102 are operable independently of each other. Additionally, except for a feed conveyor 126 that receives feed from the processing portions 112 of the sub-systems 102 and passes through all of the processing portions 112 (e.g., passes underneath all the harvesters 116 of the sub-systems 102), the processing portions 112 also are operable independently of each other. The sub-systems 102 are positioned in close proximity to each other so that the overall footprint occupied by the system 100 is minimized. In certain examples, although not shown, the system 100 can include multiple racking portions 110 and only a single processing portion 112 that processes the seed, trays, and feed for all of the multiple racking portions 110.

The racking portion 110 of each one of the sub-systems 102 includes at least one rack 104, according to some examples described in this paragraph. In certain examples, each one of the sub-systems 102 includes a first rack 104A and a second rack 104B separated by an aisle 128. The first rack 104A and the second rack 104B are duplicate racks in some examples. Accordingly, unless otherwise noted, the features of each one of the first rack 104A and the second rack 104B of each sub-system 102 will be associated with the rack 104. The rack 104 includes shelves 144 that are vertically spaced apart from each other (see, e.g., FIG. 6). The vertical spacing between shelves 144 is greater than a height of a tray 106 so that a tray 106 can be supported on a shelf 144 and not interfere with the next vertically adjacent shelf 144. In some examples, the shelves 144 of the rack 104 are deep enough to support at least one tray 106. However, as shown, in other examples, the shelves 144 of the rack 104 are deep enough to support at least two trays 106 in a back-to-back manner (e.g., a two-deep configuration, a three-deep configuration, or a more than three-deep configuration). The depth of each shelf 144 is a dimension of the shelf 144 in a direction perpendicular to the aisle 128 of the sub-system 102. In contrast, a length of each shelf 144 is a dimension of the shelf 144 perpendicular to the depth of the shelf 144 and parallel to the aisle 128. The length of each shelf 144 is selected so that a desired number of trays 106 fit side-by-side along the length of the shelf 144. Additionally, the rack 104 has an overall height that corresponds with the total number of shelves 144 and the height, or thickness, of the tray 106. Generally, the rack 104 can have any of various heights (i.e., any of various quantities of shelves 144), and the shelves 144 can have any of various depths and lengths, to accommodate any number of trays 106.

Because the trays 106 are effectively vertically stacked when supported on the shelves 144, the system 100 is capable of accommodating a relatively large feed growing surface area per ground surface area compared to conventional methods. In other words, the system 100 occupies a footprint that is much smaller than the area available for growing feed above the footprint. According to some examples, a ratio of the total feed growing surface area per the total footprint of the racking portion 110 of each one of the sub-systems 102 is between, and inclusive of, 0.9 and 27.4 (e.g., at least 17.5). For example, in some instances, the racking portion 110 of each one of the sub-systems 102 has a footprint that is around 3,500 square feet, has thirty shelves 144, and supports between, and inclusive of, 200 trays and 6,000 trays (e.g., between, and inclusive of, 3,000 trays and 4,000 trays (such as at least about 3,840 trays)), and each tray is 4 feet by 4 feet and accommodates about 16 square feet of growing surface area. The growing capacity of the system 100 is easily scalable by increasing the length of the racking portion 110, to increase the number of trays 106 supportable on each shelf 144, and increasing the height of the racking portion 110, to increase the number of shelves 144.

The racking portion 110 of each one of the sub-systems 102 includes a robot 108 in some examples. As used herein, a robot is any of various electronic devices or mechanisms that are guided by automatic controls and/or that automatically perform designated tasks, such as complicated and/or repetitive tasks. According to various examples, the robot 108 is a transporter, such as an electronically-controlled transporter. In some examples, the system 100 includes multiple robots 108 each associated with a corresponding one of the sub-systems 102. For each sub-system 102, the robot 108 is configured to automatically place the trays 106 in and retrieve the trays 106 from specific storage locations, in the rack 104 of the racking portion 110 of the sub-system 102, using computer-controlled methods. In some examples, the robot 108 is one of a vertical lift module, a gantry crane, or any of various other automated storage and retrieval system (ASRS) devices used to store and retrieve loads in an automated manner. According to some examples, the robot 108 is a mini-load ASRS robot, which has a capacity of up to 1,000 pounds in some instances. In other examples, the robot 108 is a unit-load ASRS robot, which has a capacity of greater than 1,000 pounds in some instances. In various examples, where speed is prioritized, the robot 108 is a mini-load ASRS robot because its movements are faster than a unit-load ASRS robot.

Figure 6:
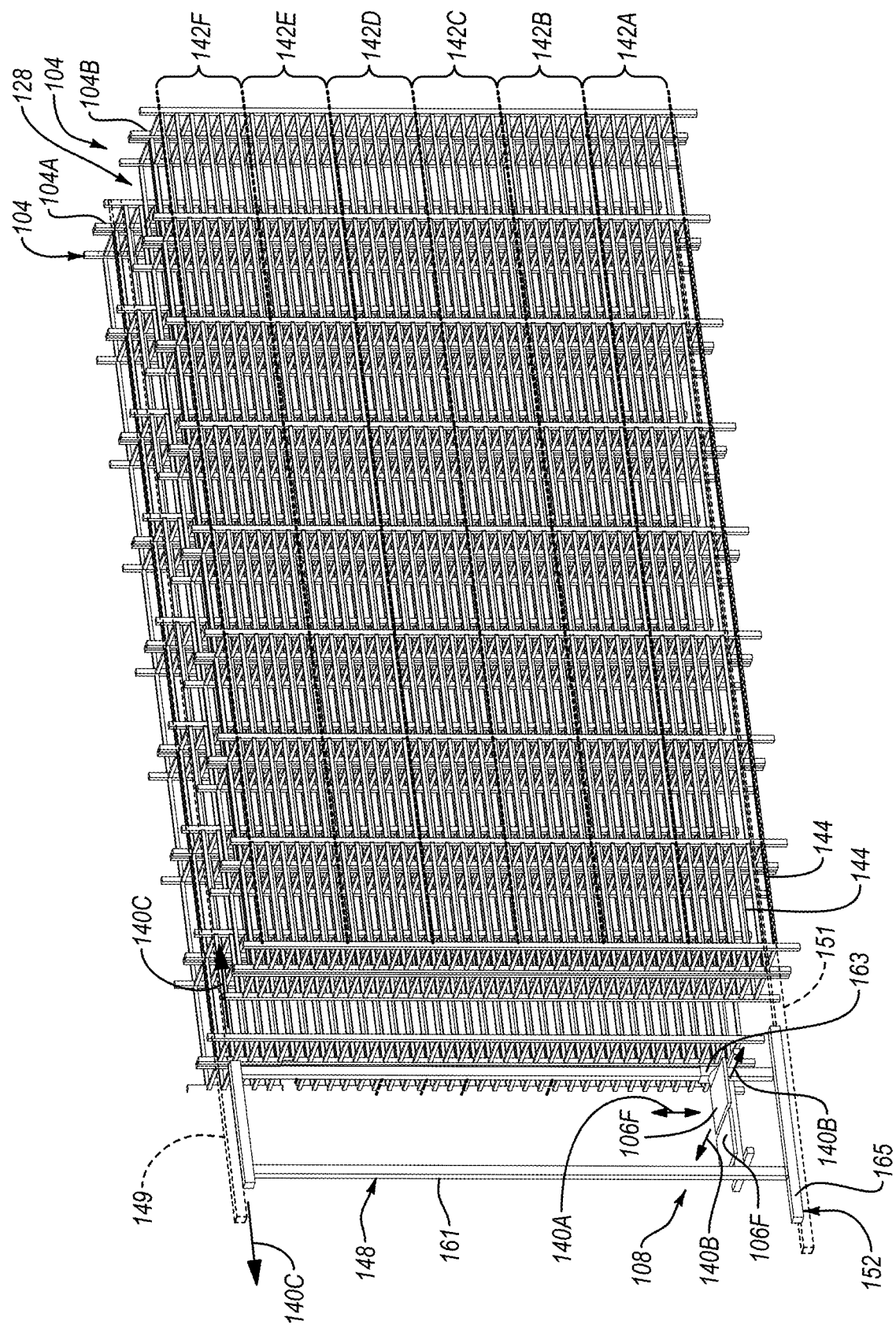
FIG. 6 is a perspective view of a robot and a rack of a system for growing and harvesting living matter, according to one or more examples of the present disclosure.
Figure 7:
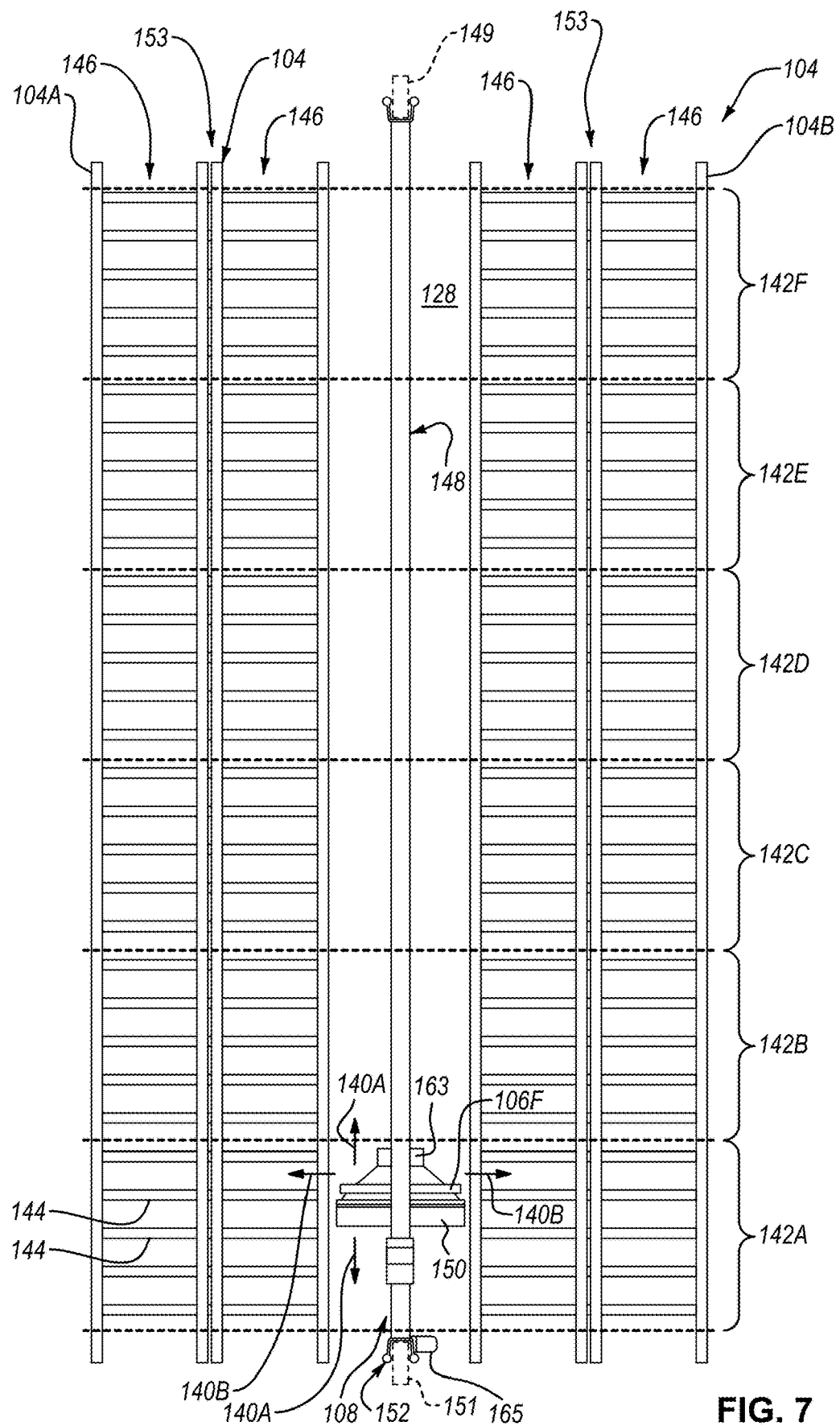
FIG. 7 is a front elevation view of the robot and the rack of FIG. 6, according to one or more examples of the present disclosure.
Figure 8:
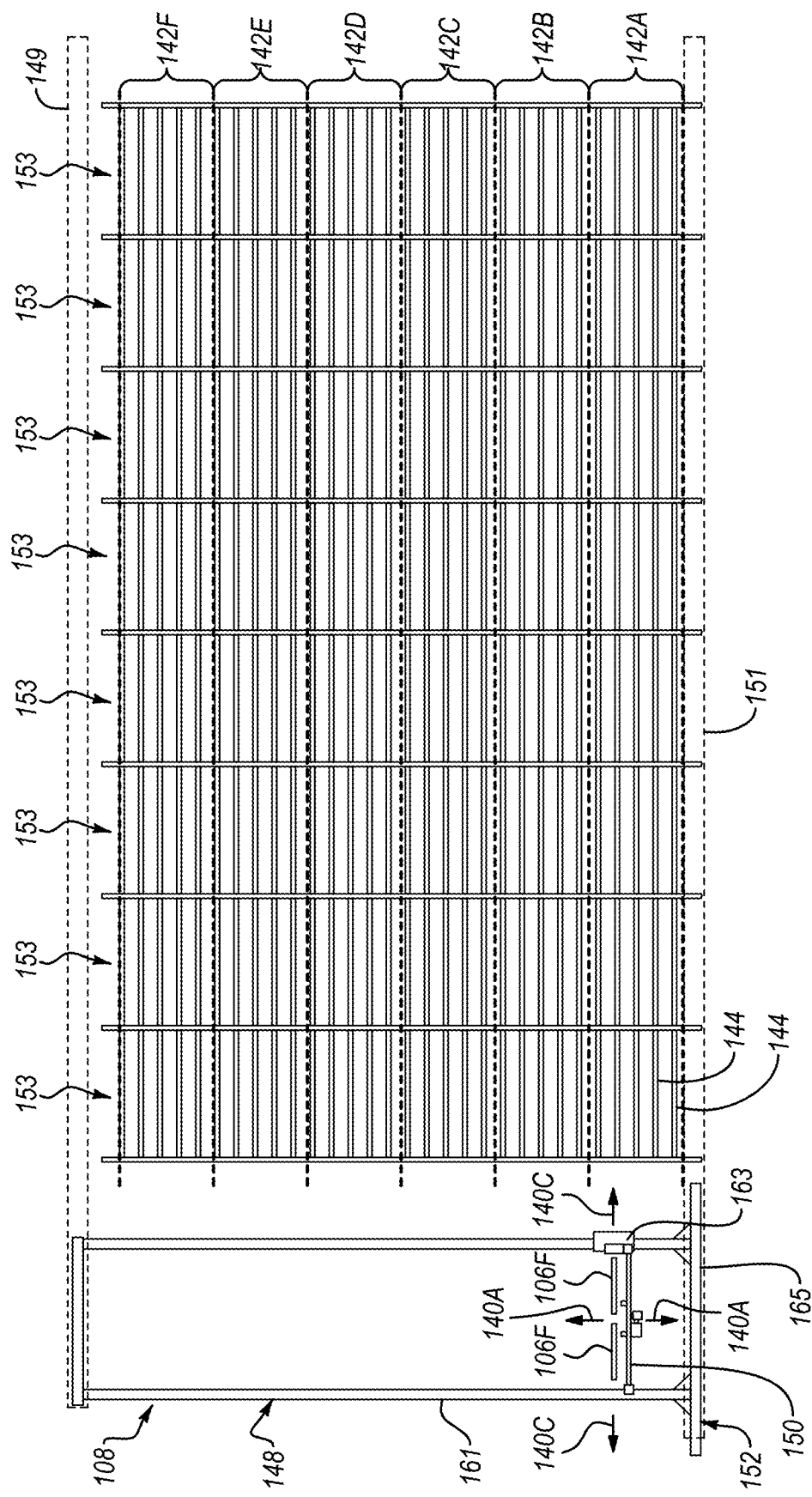
FIG. 8 is a side elevation view of the robot and the rack of FIG. 6, according to one or more examples of the present disclosure.

Referring to FIGS. 6-8, according to one example described in this paragraph, the robot 108 includes a vertical movement portion 148 and a horizontal movement portion 152. The vertical movement portion 148 includes a mast 161 and a motorized vertical carriage 163. The vertical carriage 163 can be movable upwardly and downwardly (see, e.g., directional arrows 140A) along the mast 161 via control signals from the electronic controller 103. The horizontal movement portion 152 includes a motorized horizontal carriage 165 (e.g., an upper horizontal carriage and a lower horizontal carriage), an upper track 149, and a lower track 151. The horizontal carriage 152 can be movable forward and backward (see, e.g., directional arrows 140C) along the upper track 149 and the lower track 151 via control signals from the electronic controller 103. The upper track 149 and the lower track 151 extend along the aisle 128, which enables the robot 108 to move between the aisle 128. Moreover, in addition to facilitating horizontal movement of the vertical movement portion 148 along the aisle 128, the upper track 149 and the lower track 151 help to stabilize and stiffen the vertical movement portion 148. The upper track 149 can be supported by stands extending from the ground or floor, and/or can be fixed to a roof of an indoor facility. The lower track 151 can be fixed to the ground or floor.

In some examples, the vertical movement portion 148 is configured to move the trays 106 via a tray support arm 150 fixed to the vertical carriage 163. When the trays 106 are supported on the tray support arm 150 of the robot 108, movement of the vertical carriage 163 along the mast 161 results in movement of the tray support arm 150 and the trays 106, relative to the shelves 144 of the rack 104, in a vertical direction, as shown by the directional arrows 140A.

The horizontal movement portion 152 is configured to move the mast 161 and the tray support arm 150 in a horizontal direction, indicated by the directional arrows 140C, along the aisle 128, in certain examples. In this manner, the horizontal movement portion 152 is operable to precisely position the trays 106 on the tray support arm 150 at any of various horizontal locations corresponding with horizontal tray positions on the shelves 144. The horizontal movement portion 152 can additionally include actuators that move the trays 106, relative to the tray support arm 150, onto a shelf 144 in a horizontal direction, as indicated by directional arrows 140B. The actuators can be telescoping arms that increase or decrease in length in the horizontal direction. In some examples, the tray support arm 150 includes clamps or other retention means, which are configured to secure the trays 106 on the tray support arm 150 as the robot 108 moves the trays 106 from the infeed staging zone 124 to a rack 104, and from the rack 104 to the outfeed staging zone 114.

In some examples, the racks 104 of each one of the sub-systems 102 are divided into multiple designated tray storage positions, each associated with a unique position on one of the racks 104 in which a tray can be positioned and each identified by the electronic controller 103 with a unique identifier (e.g., an identified one of the two racks 104, an identified one of the multiple shelves 144, an identified one of front or back locations on a shelf, and an identified one of the multiple rows of the racks 104). According to certain examples, at least one of the rack, the shelf, front or back location, and the row of the unique identifier of any one of the tray storage positions is different than the rack, the shelf, the front or back location, and the row of any other one of the tray storage positions. The electronic controller 103 can be operable to control the robot 108 to position a tray 106 into any one of the multiple designated tray storage positions. In certain examples, each one of the trays 106 has a unique identifier, which can be read and uploaded to the electronic controller 103, such as via an RFID reader or scanner of the system 100 and an RFID tag or QR code attached to the tray. The electronic controller 103 can then assign one of the multiple designated tray storage positions to the unique identifier of the tray 106 and command the robot 108 to move the tray to the assigned one of the multiple designated tray storage positions.

According to some examples described in this paragraph, the processing portion 112 of each one of the sub-systems 102 includes a harvester 116, a cleaner 118, a tray setter 120, a seeder 122, and at least a portion of a feed conveyor 126, such as those described above. Additionally, the processing portion 112 includes an outfeed staging zone 114 and an infeed staging zone 124. Each one of the trays 106 of the system 100 can be identified by the contents or condition of the tray 106 as it moves through the system 100. As a tray 106 automatically moves through the system 100, such as via automatic conveyors, the contents or the condition of the tray 106 is changed by each one of the harvester 116, the cleaner 118, the tray setter 120, and the seeder 122.

Figure 4:
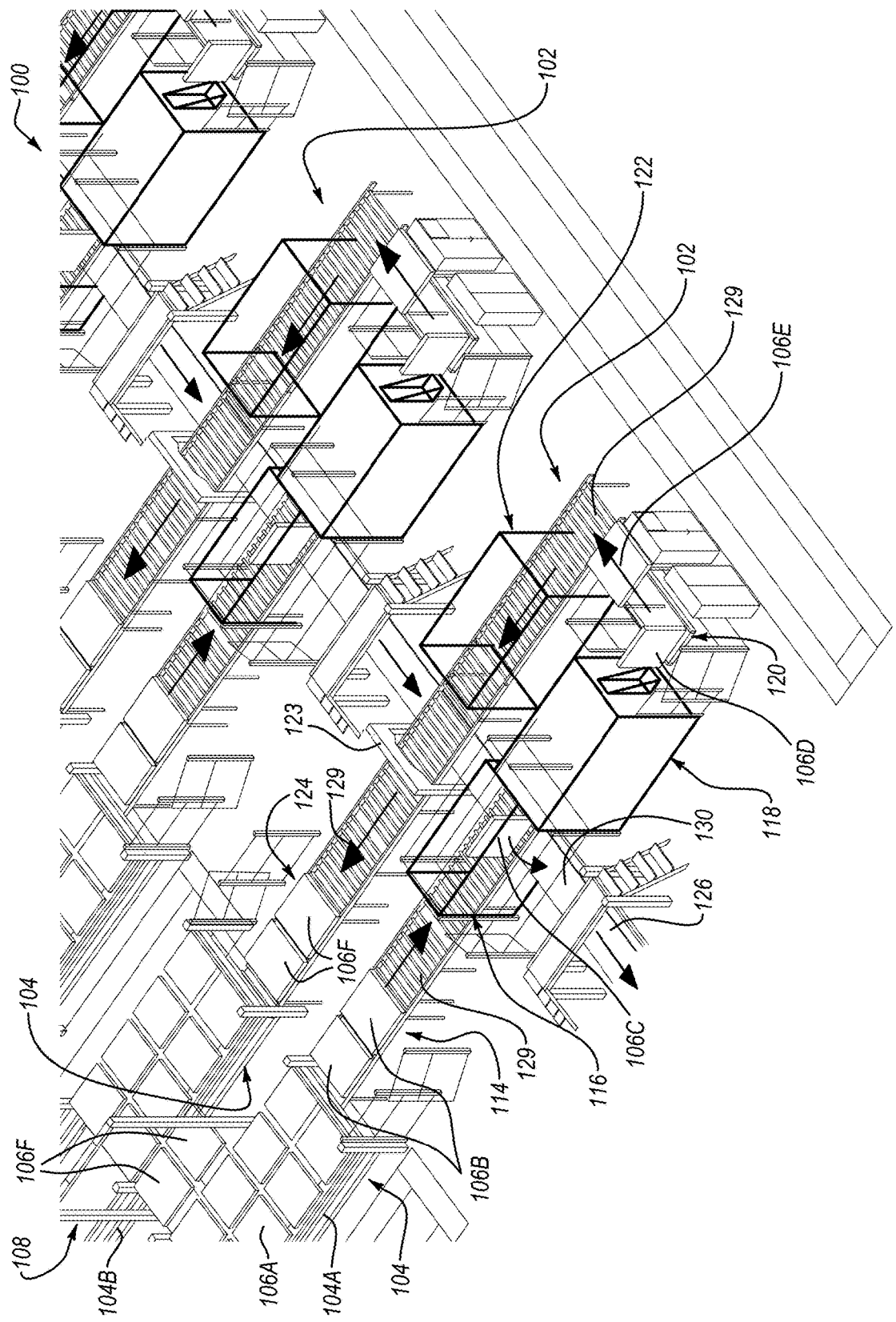
FIG. 4 is a perspective view of a portion of the system of FIG. 2, according to one or more examples of the present disclosure.
Figure 5:
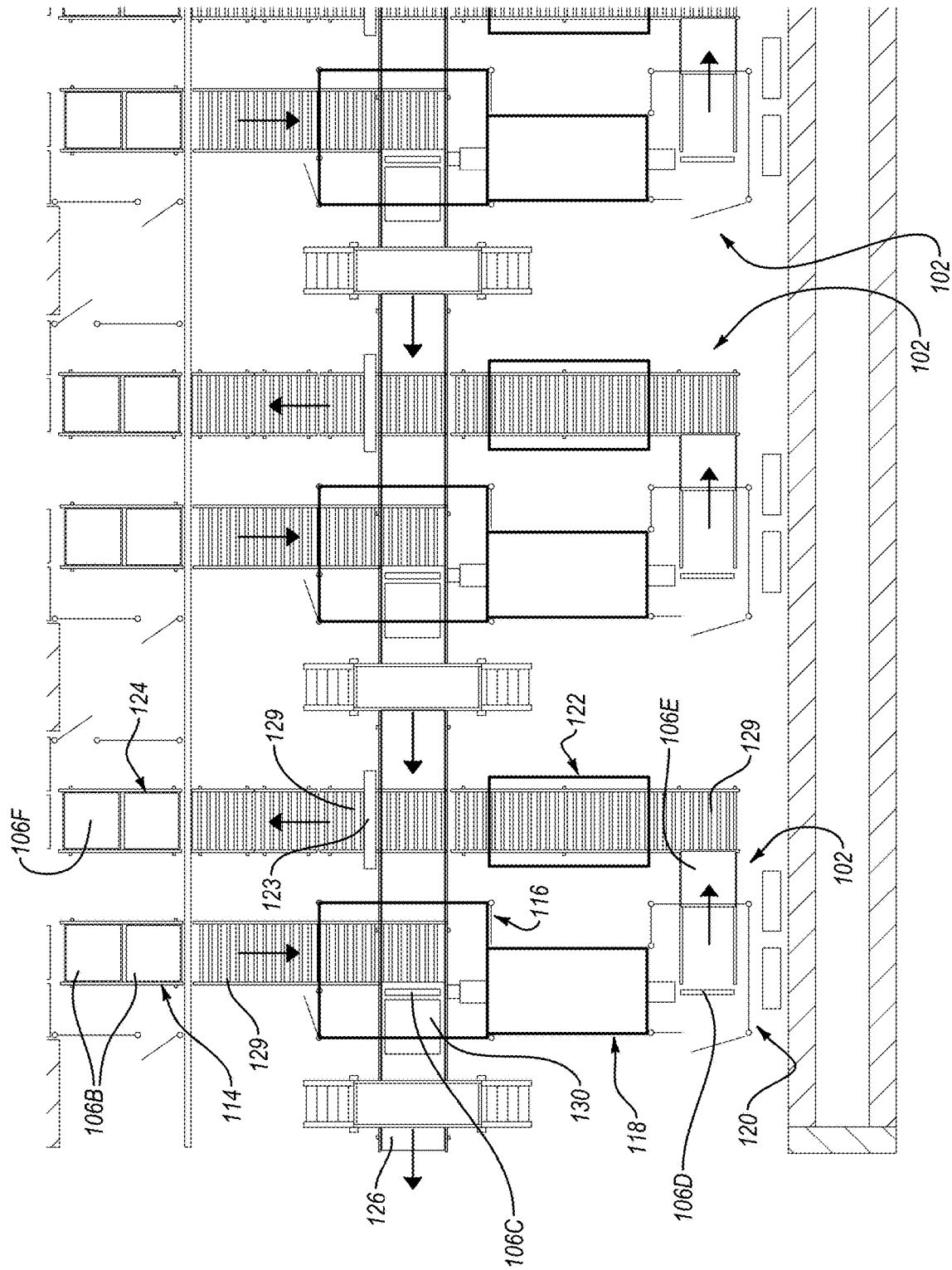
FIG. 5 is a top plan view of the portion of the system of FIG. 4, according to one or more examples of the present disclosure.

Referring to FIGS. 4 and 5, according to certain examples described in this paragraph, an animal feed growing and harvesting process begins with the tray 106 in a clean and empty state (i.e., a clean-empty tray 106E). The clean-empty tray 106E is oriented on a conveyor in an orientation ready for receiving seed. The conveyor conveys the clean-empty tray 106E into engagement with the seeder 122, which distributes seed into the clean-empty tray 106E. In certain examples, the tray 106 remains on the conveyor as the tray 106 receives the seed and moves out of engagement with the seeder 122, via actuation of the conveyor, after the tray 106 receives the seed. With seed in the tray 106, the tray 106 is in a seeded state (i.e., seeded tray 106F). In some examples, the seeder 122 is configured to uniformly distribute a predetermined quantity of the seed throughout the tray 106. The predetermined quantity can be based on one or more factors, such as type of seed, growth cycle, environmental conditions, feed cycles, and/or the like. To facilitate and maintain uniform distribution of the seed, in certain examples, as shown in FIG. 9, the tray 106 has one or more partitions 162, coupled to (e.g., formed in or attached to) the grow surface 156 and which divide the interior cavity 154 into multiple sections. Uniformity is maintained because seed in one section is prevented by the partitions 162 from migrating to another section.

Figure 13:
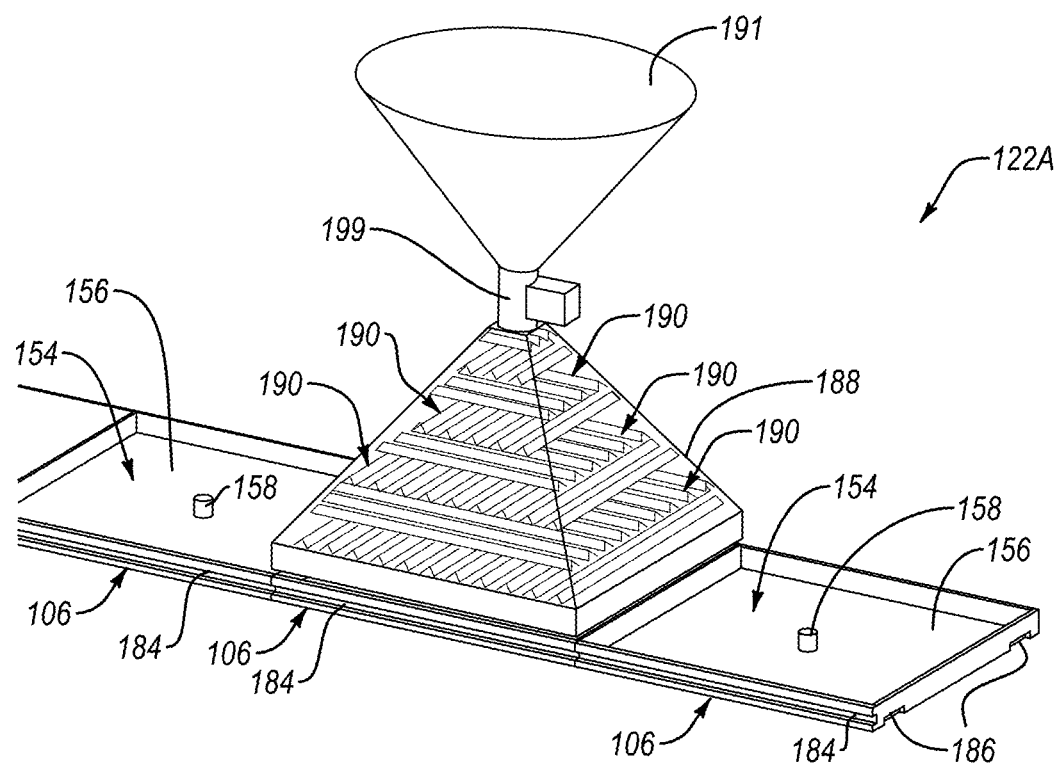
FIG. 13 is a perspective view of a seeder of a system for growing and harvesting living matter, according to one or more examples of the present disclosure.
Figure 14:
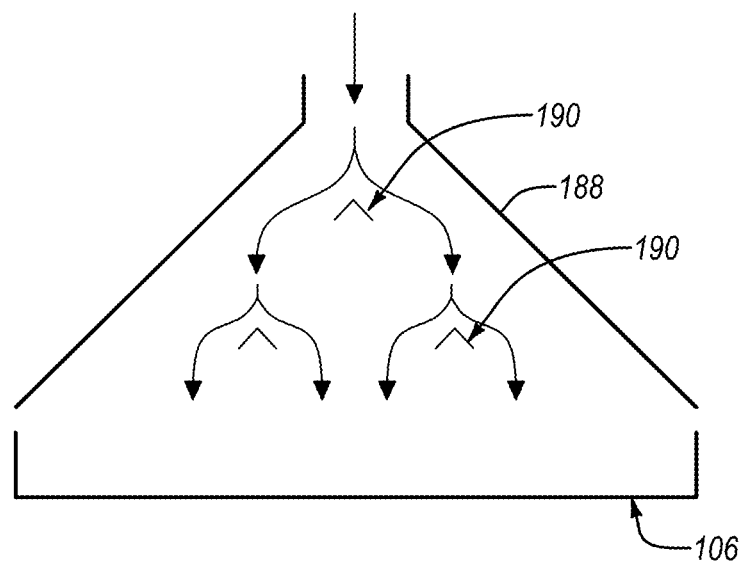
FIG. 14 is a cross-sectional side elevation view of a seeder of a system for growing and harvesting living matter, according to one or more examples of the present disclosure.

Referring to FIGS. 13 and 14, one example of the seeder 122 is shown as seeder 122A. In the example of FIGS. 13 and 14, which is described in this paragraph, the seeder 122A is gravity-fed (e.g., gravity-fed seeder) and includes a hopper 191 into which seed from the seed source 132 dispensed. From the hopper 191, the seed passes through a valved neck 199, which can include an electronically-controllable valve. The valve is actuatable between an open state, to enable seed to pass through the valved neck 199, and a closed state, to prevent seed from passing through the valved neck 199. The valved neck 199 is open to a baffle system 188, which includes multiple sets of dividers 190 within a housing. Each set of dividers 190 is vertically spaced apart from any other set of dividers 190. The dividers of each set of dividers 190 are horizontally spaced apart so that gaps are defined between the dividers. The gaps between the dividers of all the sets of dividers 190 can be the same in some examples. Moreover, the dividers have upward-pointed angled surfaces that direct seed to one or the other side of each divider and through the adjacent gaps. In some examples, the housing is a pyramid shaped or diverging housing. The dividers of each set of dividers 190 are horizontal and parallel to each other and span the cross-sectional area of the pyramid-shaped housing. Accordingly, the dividers of each one of the sets of dividers 190 have a length that is different relative to the length of the dividers of any other one of the sets of dividers 190. The dividers of any one set of dividers 190 extend in a direction perpendicular to that of the dividers of any adjacent one of the sets of dividers 190.

According to some examples, when a tray 106 is engaged with the seeder 122 (e.g., positioned underneath the baffle system 188), the valve of the valved neck 199 is opened, which allows seed to flow from the hopper 191, through the valved neck 199, and into the baffle system 188. As the seed is gravity fed through the baffle system 188, as indicated by directional arrows, the seed impacts one or more dividers, which separates and disperses the seed radially outwardly such that as the seed passes through all the gaps of and exits the baffle system 188, the seed is uniformly distributed across an area equal to an area of an interior cavity 154 of the tray 106.

It is recognized that once seed passes through the neck 199 of the seeder 122A, in some examples, electrical power is not required to redistribute and flow the seed through the baffle system 188. According to further examples, the baffle 188 does not have moving parts. Accordingly, the baffle 188 is configured to passively distribute seed to the trays according to a designed or designated rate (e.g., seeds per unit time). Because of this, the baffle 188 is considered a static baffle (i.e., no moving parts, no computer control, etc.), which promotes more prolonged and reliable operation.

Figure 15:
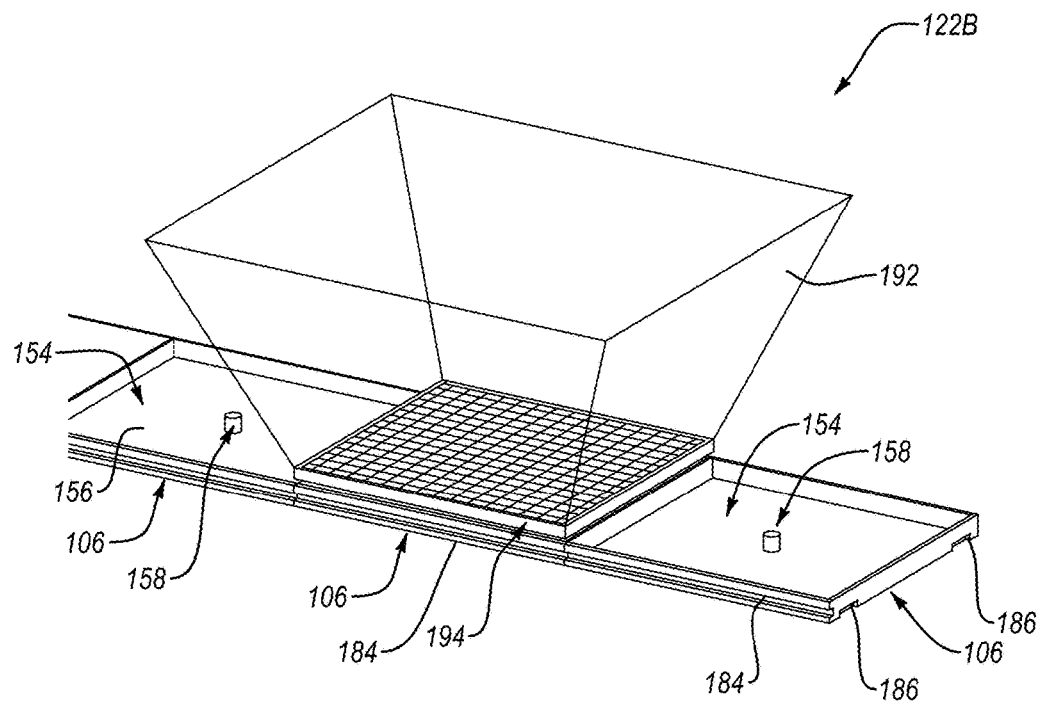
FIG. 15 is a perspective view of a seeder of a system for growing and harvesting living matter, according to one or more examples of the present disclosure.
Figure 16:
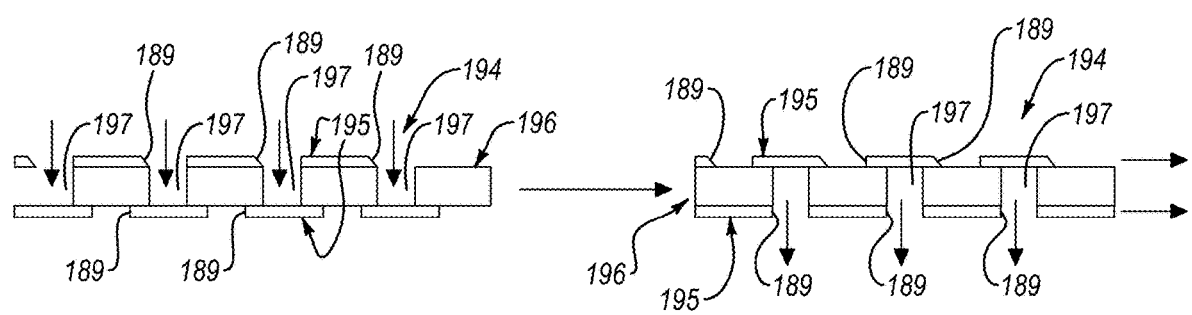
FIG. 16 is a cross-sectional side elevation view of a sifting system of the seeder of FIG. 15, taken along the line 15-15 of FIG. 15 and showing the sifting system transitioning from a first configuration to a second configuration, according to one or more examples of the present disclosure.

Referring to FIGS. 15 and 16, another example of the seeder 122 is shown as seeder 122B. In the example of FIGS. 15 and 16, which is described in this paragraph, the seeder 122B is gravity-fed and includes a hopper 192 into which seed from the seed source 132 is dispensed. From the hopper 192, the seed is gravity-fed onto a sifting system 194 of the seeder 122B. The sifting system 194 includes a perforated base plate 196, which has multiple apertures 197 uniformly spaced apart from each other. The sifting system 194 also includes a perforated sifting plate 195 that has a top portion and a bottom portion, which are spaced apart from each other. The perforated base plate 196 is positioned between the top portion and the bottom portion of the perforated sifting plate 195. Moreover, the perforated sifting plate 195 is movable (e.g., slidable) relative to the perforated base plate 196. Each one of the top portion and the bottom portion of the perforated sifting plate 195 includes multiple openings 189. The openings 189 of the top portion are uniformly spaced to be alignable with corresponding ones of the apertures 197 when the perforated sifting plate 195 is in a seed receiving position (see, e.g., left side of FIG. 16), and the openings 189 of the bottom portion are uniformly spaced to be alignable with corresponding ones of the aperture 197 when the perforated sifting plate 195 is in a seed delivering position (see, e.g., right side of FIG. 16). In other words, the openings 189 in the top portion and the bottom portion have the same pattern and are uniformly spaced, but are staggered or horizontally offset relative to each other.

In operation, when the perforated sifting plate 195 is in the seed receiving position, seed is allowed to pass through the openings 189 in the top portion and accumulate in the apertures 197 of the perforated base plate 196. The perforated sifting plate 195 is then translationally moved (e.g., slid along), relative to the perforated base plate 196, until the perforated sifting plate 195 is in the seed delivering position, which allows the seed accumulated in the apertures 197 to fall out from the apertures 197, through the openings 189 of the bottom portion, and into the interior cavity 154 of the tray 106. Because the apertures 197 and openings 189 are uniformly spaced, the seed is uniformly distributed across an area equal to the area of an interior cavity 154 of the tray 106 upon falling into the tray 106. The movement between the perforated sifting plate 195 and the perforated base plate 196 is reciprocated to add additional seed to the tray 106.

Figure 17:
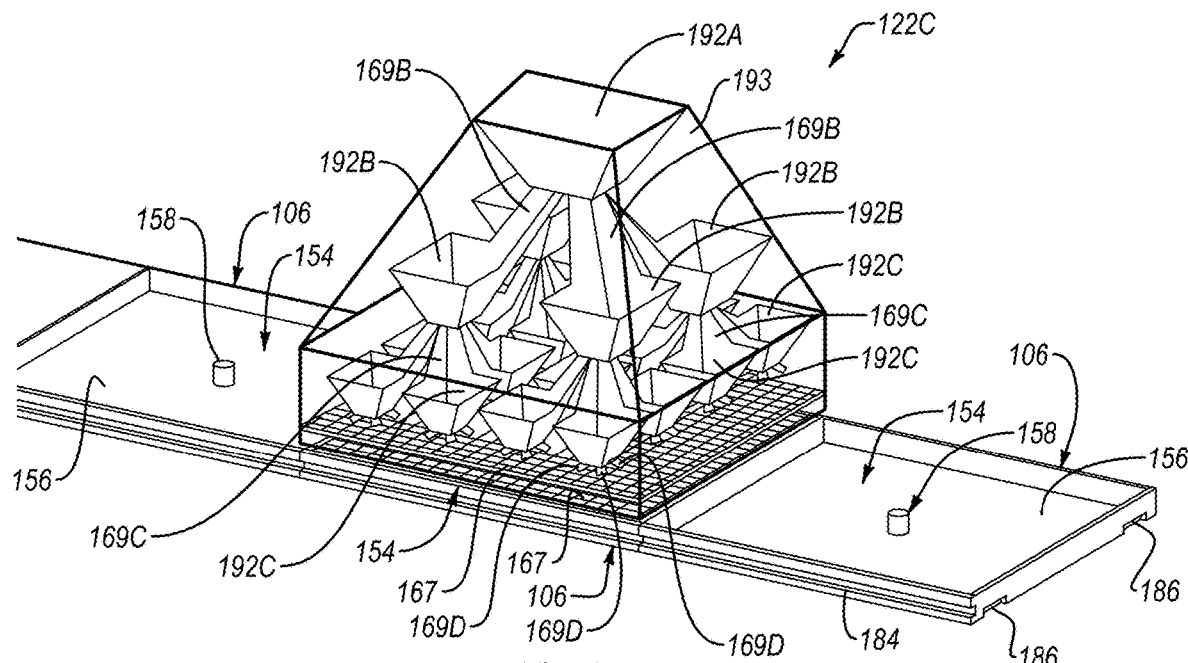
FIG. 17 is a perspective view of a seeder of a system for growing and harvesting living matter, according to one or more examples of the present disclosure.
Figure 18:
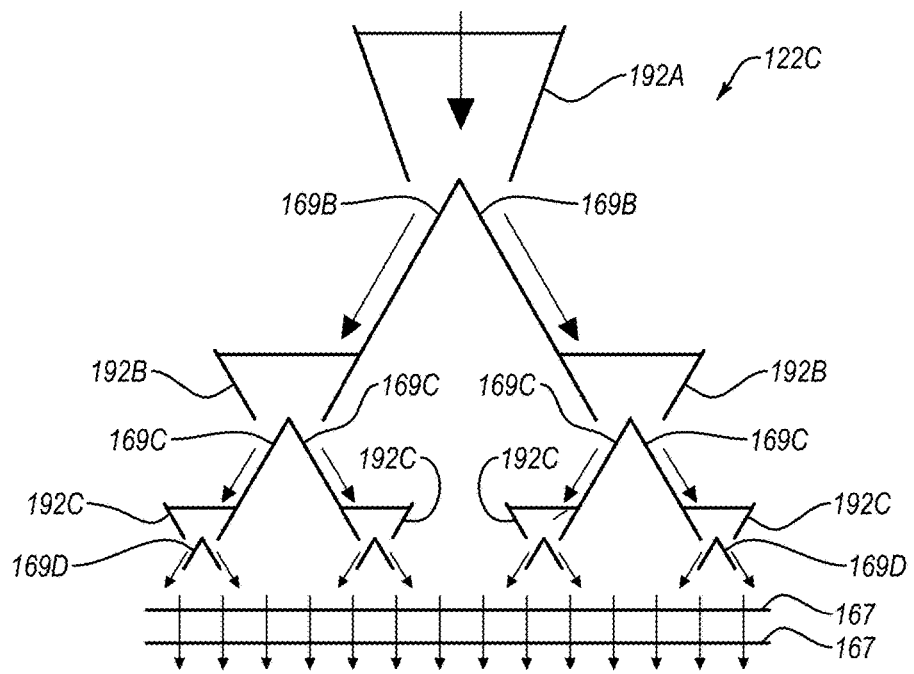
FIG. 18 is a schematic cross-sectional side elevation view of a seeder of a system for growing and harvesting living matter, according to one or more examples of the present disclosure.

Referring to FIGS. 17 and 18, another example of the seeder 122 is shown as seeder 122C. In the example of FIGS. 17 and 18, which is described in this paragraph, the seeder 122C is gravity-fed and includes a primary hopper 192A into which seed from the seed source 132 is dispensed. The primary hopper 192A is centrally located relative to a center of a tray 106 being seeded. Moreover, a maximum cross-sectional area of the primary hopper 192A is less than a maximum area (e.g., maximum area of the growing surface 156) of the tray 106. From the primary hopper 192A, the seed is gravity-fed into one of a plurality of primary chutes 169B that are angled outwardly away from the primary hopper 192A. In the illustrated example, the seeder 122C includes four primary chutes 169B equidistantly spaced about an outlet of the primary hopper 192A. Each one of the primary chutes 169B defines a channel that receives, contains, and enables sliding of seed received from the outlet of the primary hopper 192A. The seeder 122C further includes a plurality of secondary hoppers 192B each in seed receiving communication with a corresponding one of the primary chutes 169B. Accordingly, in the illustrated example, the seeder 122C includes four secondary hoppers 192B. The maximum cross-sectional area of each one of the secondary hoppers 192B is smaller than the maximum cross-sectional area of the primary hopper 192A. Additionally, the primary hopper 192A is centrally located relative to the four secondary hoppers 192B. In other words, the four secondary hoppers 192B are located at the same distance outwardly away from the primary hopper 192A and equidistantly spaced about the primary hopper 192A.

In the illustrated examples, from the secondary hoppers 192B, the seed is gravity-fed into one of a plurality of secondary chutes 169C of a plurality of sets of secondary chutes 169C. More specifically, the seed from each one of the secondary hoppers 192B is gravity-fed into several corresponding ones of the plurality of secondary chutes 169C. Each set of secondary chutes 169C receives seed from a corresponding one of the secondary hoppers 192B and are angled outwardly away from the corresponding one of the secondary hoppers 192B. In the illustrated example, the seeder 122C includes four secondary chutes 169C equidistantly spaced about an outlet of each one of the secondary hoppers 192B. Accordingly, the illustrated example of the seeder 122C includes four secondary hoppers 192B and sixteen secondary chutes 169C. Each one of the secondary chutes 169C defines a channel that receives, contains, and enables sliding of seed received from the outlet of a corresponding one of the secondary hoppers 192B. The seeder 122C further includes a plurality of tertiary hoppers 192C each in seed receiving communication with a corresponding one of the secondary chutes 169C. Accordingly, in the illustrated example, the seeder 122C includes sixteen tertiary hoppers 192C. The maximum cross-sectional area of each one of the tertiary hoppers 192C is smaller than the maximum cross-sectional area of each one of the secondary hoppers 192B.

In the illustrated examples, from the tertiary hoppers 192C, the seed is gravity-fed into one of a plurality of tertiary chutes 169D of a plurality of sets of tertiary chutes 169D. More specifically, the seed from each one of the tertiary hoppers 192C is gravity-fed into several corresponding ones of the plurality of tertiary chutes 169D. Each set of tertiary chutes 169D receives seed from a corresponding one of the tertiary hoppers (192C) and each one of the tertiary chutes 169D is angled outwardly away from the corresponding one of the tertiary hoppers 192C. In the illustrated example, the seeder 122C includes four tertiary chutes 169D equidistantly spaced about an outlet of each one of the tertiary hoppers 192C. Accordingly, the illustrated example of the seeder 122C includes sixteen tertiary hoppers 192C and sixty-four tertiary chutes 169D. Each one of the tertiary chutes 169D defines a channel that receives, contains, and enables sliding of seed received from the outlet of a corresponding one of the tertiary hoppers 192C.

In some examples described in this paragraph, the seeder 122C additionally includes one or more seeding grates 167 below the tertiary chutes 169D. In the illustrated example, the seeder 122C includes two seeding grates 167 that vertically overlap with each other and are spaced apart from each other. Each one of the seeding grates 167 includes spaced-apart apertures each sized to enable a limited number of seed to pass through at a time. The seeding grates 167 are interposed between the tertiary chutes 169D and a tray 106 positioned below the seeder 122C. From the tertiary chutes 169D, the seed is gravity-fed onto the seeding grates 167. The seed passes through the apertures of the seeding grates 167 and falls into the tray 106 beneath the seeding grates 167.

In some examples described in this paragraph, the seeder 122C further includes a housing 193 that houses the hoppers, chutes, and seeding grates of the seeder 122C. The housing 193 can have an upper opening corresponding in size with (e.g., same size as) an inlet of the primary hopper 192 so that seed can be delivered into the primary hopper 192. In some examples, the upper opening of the housing 193 coexistent with or flush with the inlet of the primary hopper 192. The housing 193 also includes a lower opening, corresponding in size with (e.g., same size as) the tray 106, so that seed passing through the seeding grates 167 can be received by the tray 106. Accordingly, the housing 193 effectively laterally encloses the hoppers, chutes, and seeding grates and prevents seed that inadvertently falls out of the hoppers, chutes, and seeding grates from falling outside the tray 106. Each one of the hoppers of the seeder 122C defines a seed collection receptacle that tapers in a top-to-bottom direction. In other words, the cross-sectional area of the seed collection receptable decreases in the top-to-bottom direction, such that the seed collected in the receptacle is funneled into a corresponding chute. The seed collection receptacles of the hoppers can have any of various cross-sectional shapes. In some examples, such as shown, the seed collection receptacle of each one of the hoppers has a quadrilateral shape, such as square or rectangular (i.e., each one of the hoppers has four interconnected sides that define the seed collection receptacle). The housing 193 can have a shape that corresponds with the shape of the hoppers, particularly the primary hopper 192A. For example, the primary hopper 192A can have a quadrilateral cross-sectional shape, and the housing 193 can have a pyramidal shape and a quadrilateral cross-sectional shape. Because the chutes extend outwardly relative to the hopper from which seed is received, the housing 193 is flared or widens in a top-to-bottom direction. According to certain examples, the hoppers and the chutes are open at the top. However, in some examples, the hoppers and the chutes have a substantially closed top.

The seeder 122C promotes uniform distribution of seed into trays 106 by incrementally and uniformly laterally distributing seed from a centralized input before the seed is delivered into the trays 106. In operation, according to some examples described in this paragraph, a predetermined quantity of seed is delivered (e.g., in an automated manner) into the primary hopper 192A. The seed is divided into substantially equal portions as it is gravity-fed through the outlet of the primary hopper 192 and into the primary chutes 169B and corresponding secondary hoppers 192B. The portion of seed in each one of the secondary hoppers 192B is further divided into substantially equal portions as it is gravity-fed through the outlet of the secondary hopper 192B and into the secondary chutes 169C and corresponding tertiary hoppers 192C. The portion of seed in each one of the tertiary hoppers 192C is further divided into substantially equal portions as it is gravity-fed through the outlet of the tertiary hopper 192C, into the tertiary chutes 169D, and onto the seeding grates 167. The seeding grates 167 sift the seed to further uniformly distribute the seed over the area of the tray 106 before the seed falls into the tray 106.

Although, in the illustrated example, the seeder 122C includes three sets of hoppers and three sets of chutes providing for three seed re-distribution events as the seed is gravity-fed through the seeder 122C, in other examples, the seeder 122C includes only two sets of hoppers and chutes, which provide only two seed re-distribution events, or at least four sets of hoppers and chutes, which provide at least four seed re-distribution events. Generally, in certain examples, the more sets of hoppers and chutes, thus the more seed-redistribution events, the more uniform the distribution of seed in the trays 106.

It is recognized that once seed is added to the primary hopper 192A of the seeder 122C, in some examples, electrical power is not required to redistribute and flow the seed through the primary hopper 192A. According to further examples, the seeder 122C, including the primary hopper 192A and parts below the primary hopper 192A, does not have moving parts. Accordingly, the seeder 122C is configured to passively distribute seed to the trays according to a designed or designated rate (e.g., seeds per unit time). Because of this, the seeder 122C is considered a static seeder (i.e., no moving parts, no computer control, etc.), which promotes more prolonged and reliable operation than seeders with moving parts.

In the various examples of seeders disclosed herein, seed can be supplied by a seed dispensing system that dispenses seed into the hopper of a corresponding seeder according to pre-weighted batches. The hopper can be tuned (e.g., sized and shaped) to receive a specific amount (e.g., weight) of seed in separate batches (e.g., one batch per tray). Accordingly, the seed dispensing system can be configured or pre-programmed to dispense a pre-weighted batch that matches the specific weight for which a hopper of a seeder is configured to receive.

After the tray 106 is seeded, the seeded tray 106F is passed through the mister 123 where the seed is misted with water in certain examples. The mister 123, in one example, is a shroud that at least partially envelops the tray 106 and creates a wall of mist through which the seeded tray 106F passes through. The mister 123 helps to wet the seed, which helps to prevent movement of the seed as the trays are transported through the system and as the trays are watered. Misting with water can also help to promote initial germination of the seeds.

Then, in some examples described in this paragraph, after seeds of the seeded tray 106F are misted with water, the seeded tray 106F is conveyed to the infeed staging zone 124, where it awaits pick up by the robot 108. In some examples, prior to pick up by the robot 108, the tray 106 is scanned and identified. In one instance, after the seeded tray 106F leaves the seeder 122 and before it reaches the infeed staging zone 124 (or when in the infeed staging zone), the seeded tray 106F is scanned. The identification of the tray 106 is uploaded to the electronic controller 103, which assigns a new tray storage position to the tray 106, which is an empty tray storage position of one of the racks 104 of the racking portion 110 in which the tray 106 is to be delivered by the robot 108. The robot 108 then picks up the seeded tray 106F from the infeed staging zone 124 and delivers it to the new tray storage position on the rack 104 to which it is assigned. To promote efficiency, in some examples, the robot 108 delivers trays at least two at a time (e.g., to the back and front locations on the same rack, shelf, and row) to the racking portion. Accordingly, multiple seeded trays 106F are individually conveyed to the infeed staging zone 124 and wait together in the infeed staging zone 124 for pickup by the robot 108.

Figure 12A:
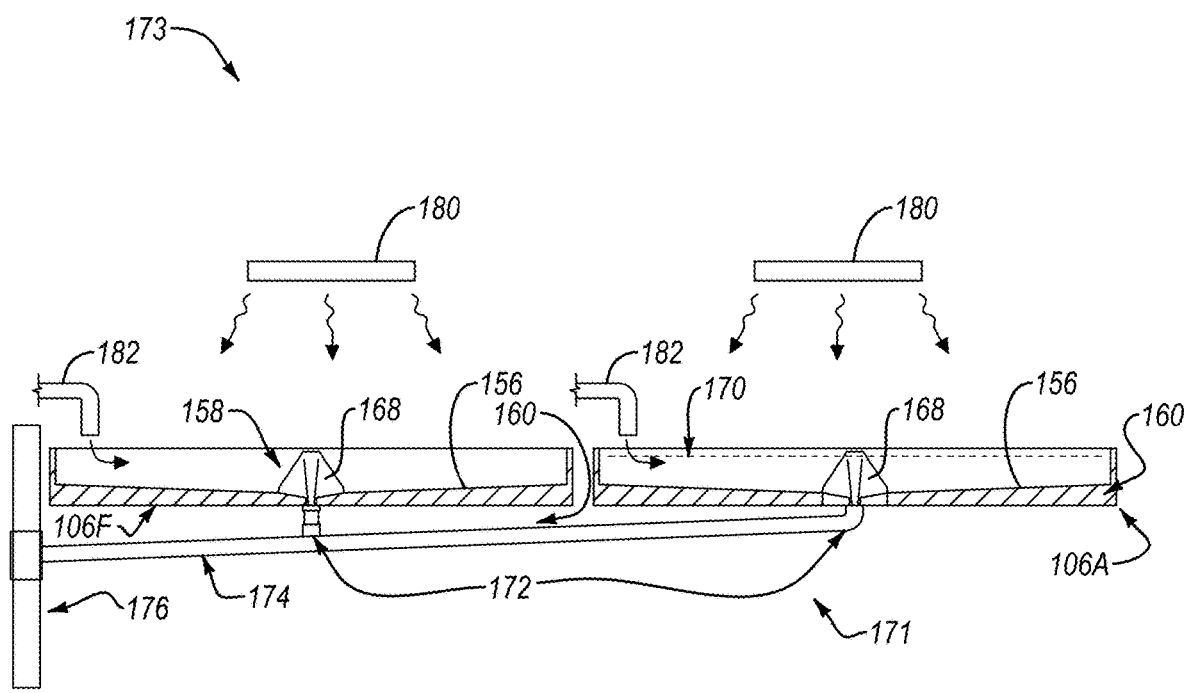
FIG. 12A is a side elevation view of a watering system, a drainage system, and a lighting system of a rack of a system for growing and harvesting living matter, according to one or more examples of the present disclosure.

After the seeded tray(s) 106F are delivered into the designated tray storage position on one of the racks 104 by the robot 108, in some examples described in this paragraph, a watering system 182 of the racking portion 110 introduces water 170 into the seeded tray 106F (see, e.g., FIG. 12A). Similar to that mentioned above with regards to the mister, the water added to the trays, via the various examples of watering systems disclosed herein, can have nutrients or supplements (e.g., hormones, $O_2$) added to water to help promote growth, taste, nutritional value of the seed, and/or kill bacteria, mold, pathogens, and/or the like. The watering system 182 includes multiple water inlet lines each associated with a corresponding one of the multiple designated tray storage positions of the racks 104. After a predetermined quantity of the water 170 is added to the seeded tray 106F, the tray 106 is in a seeded and watered state (i.e., seeded-watered tray 106A). The predetermined quantity of the water 170 can be reached passively via a drainage system 171 of the racking portion 110 (see, e.g., FIG. 12A). According to one example, the drainage system 171 includes fluid conduits (e.g., couplings 172, shelf drainage pipes 174, and rack drainage pipes 176) and siphon drains 158 are incorporated into the trays 106. In some examples, the watering system 182 and the drainage system 171 are incorporated into the racks 104 so that each one of the designated tray storage positions includes a water inlet line and a drainage line.

Referring to FIGS. 9-11C, in various examples described in this paragraph, each tray 106 includes at least one siphon drain 158. In some examples, the siphon drain 158 is located at a geometric center of the tray 106. Moreover, in the illustrated examples of FIGS. 9-11C, the tray 106 includes a grow surface 156, that defines a bottom of the interior cavity 154 and is downwardly sloped toward the geometric center of the tray 106 and the siphon drain 158. The siphon drain 158 of the illustrated examples includes a domed housing 166 (e.g., having a conical or frusto-conical shape) and a stand pipe 168 within the domed housing 166. The stand pipe 168 can be coaxial with the domed housing 166 in some examples. In the illustrated examples, the domed housing 166 (e.g., an open end of the domed housing 166) is raised slightly above the grow surface 156 so that some of the water 170 dispensed into the interior cavity 154 is able to pass through a gap between the domed housing 166 and the grow surface 156 and accumulate within the domed housing 166. The domed housing 166 has a closed end, opposite the open end, at a location above the grow surface 156, in certain examples. According to some examples, the stand pipe 168 has an upper opening at an upper portion of the domed housing 166 and a lower opening at an underside of the tray 106 (e.g., a closed bottom of the interior cavity 154). Accordingly, the stand pipe 168 passes entirely through the bottom of the tray 106 in some examples. As the water 170 is dispensed into the interior cavity 154 and the water level in the tray 106 rises, the water accumulating inside the domed housing 166 correspondingly rises. Once the water level in the tray 106 reaches a predetermined level (which can be defined as a maximum height of the water), which is associated with a height of the upper opening of the stand pipe 168, any additional water added to the tray 106 results in water draining into the stand pipe 168 via the upper opening. The water draining into the stand pipe 168 creates a siphoning effect that draws the water 179 in the interior cavity 154 into the domed housing, upward, and into the stand pipe 168. Accordingly, water is allowed to fill the interior cavity 154 up to the height of the upper opening of the stand pipe 168 without draining from the interior cavity 154. But as soon as the water level reaches the height of the upper opening of the stand pipe 168, the siphon drain 158 is activated and the water will drain from the interior cavity 154.

In some examples, any unsiphoned water in the interior cavity 154 can then be drained via one or more weep holes (not shown), which can be formed in the grow surface 156 of the tray 106. Alternatively, in other examples, one or more weep holes can be formed in the stand pipe 168 at a location near the grow surface 156, such that unsiphoned water in the interior cavity 154 can be drained through the stand pipe 168 via the weep hole(s) formed in the stand pipe 168.

Water drained into the stand pipe 168 is delivered to the fluid conduits and removed from the tray 106. The water removed from the trays 106 is recycled in some examples. As described above, the drainage system 171 is capable of passively self-regulating the level of water in the tray 106. In certain examples, the watering system 182 is controlled by the electronic controller 103 to dispense a quantity of water to achieve a level of water just below the height of the stand pipe 168, if soaking is desired, and to dispense additional water to achieve a level above the height of the stand pipe 168, if drainage of the water is desired.

Figure 11B:
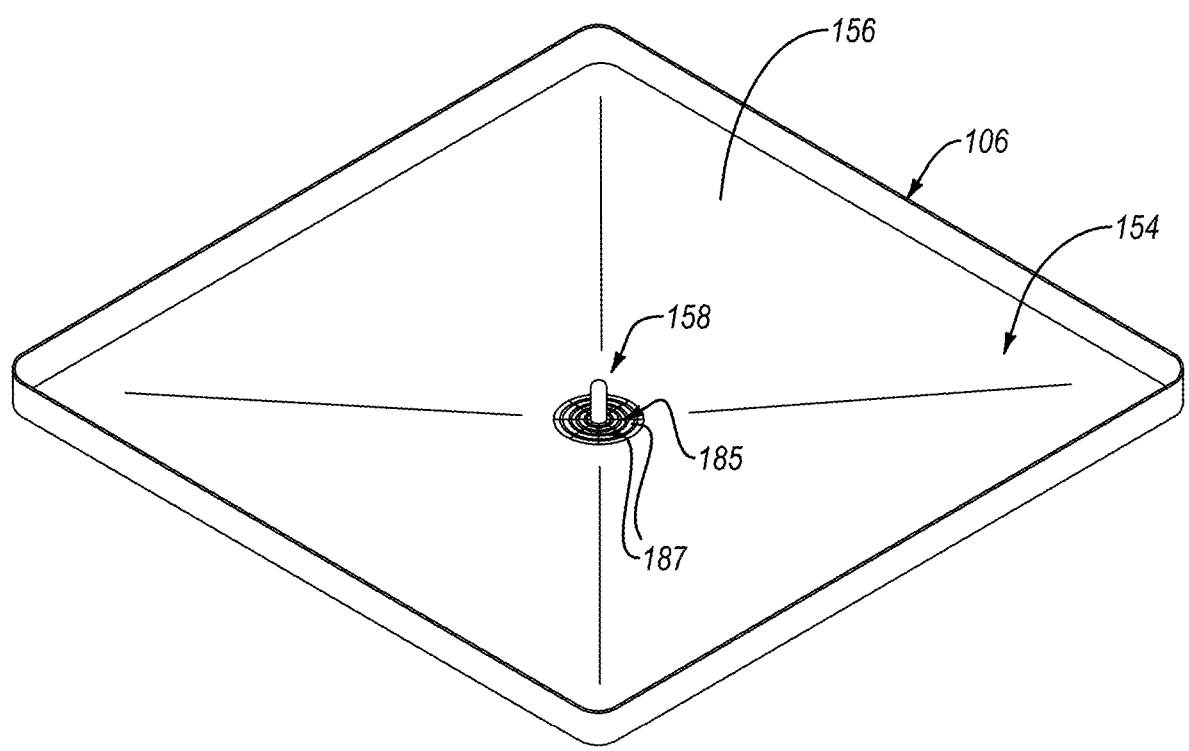
FIG. 11B is a perspective view of a tray of a system for growing and harvesting living matter, showing the tray from a top of the tray, according to one or more examples of the present disclosure.
Figure 11C:
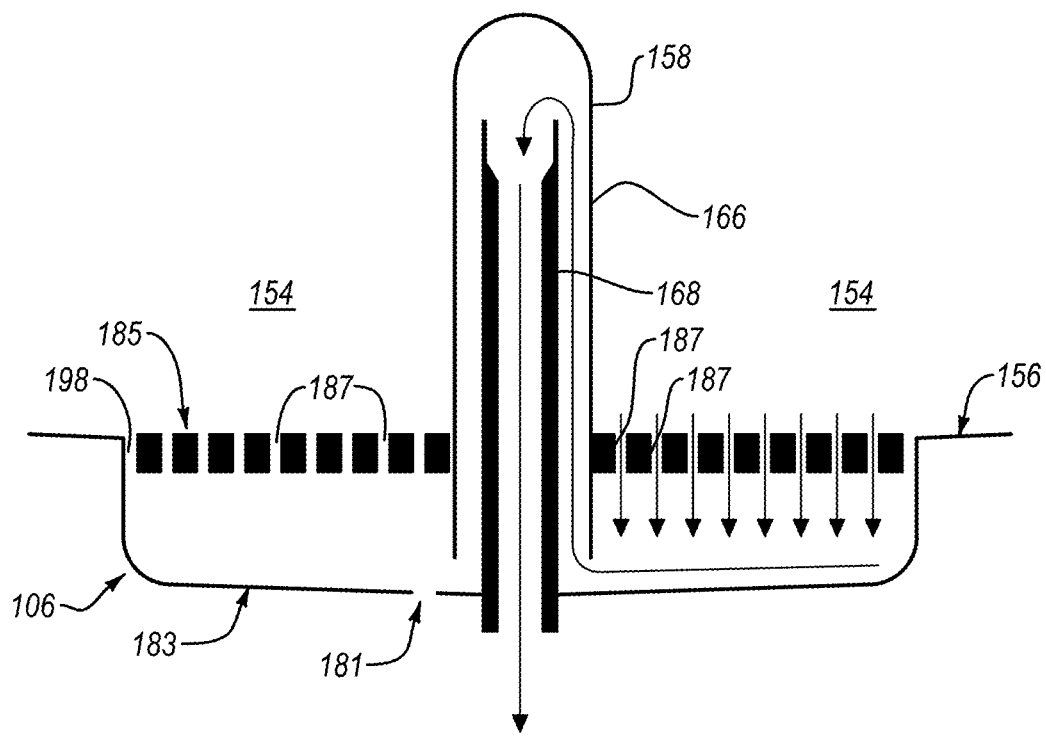
FIG. 11C is a cross-sectional side elevation view of the tray of FIG. 11B, taken along the line 11C-11C of FIG. 11B, according to one or more examples of the present disclosure.

According to some examples, as shown in FIGS. 11B and 11C, the tray 106 includes a reservoir 183 formed in, at least partially open to, and located under the grow surface 156. The grow surface 156 and the reservoir 183 define a closed bottom of the tray 106. Water in the tray 106 is allowed to flow into (e.g., fill) the reservoir 183 from the grow surface 156 via an opening 198 formed in the grow surface 156 and located above the reservoir 183. Because the reservoir 183 is below the grow surface 156, any water in the reservoir 183 is located below seed in the tray 106 and thus does not contact the seed. Moreover, to facilitate a separation of the seed from water in the reservoir 183, the tray 106 can further include a grate 185 that covers the reservoir 183 and includes apertures 187 small enough to prevent the passage of seeds into the reservoir 183, but large enough to allow the passage of water into the reservoir 183. The reservoir 183 and the grate 185 can be located at a lowermost portion of the grow surface 156 around the siphon drain 158, such that water in the tray 106 is guaranteed to flow into the reservoir 183. Additionally, the entrance into the domed housing 166 is located within the reservoir 183, such that water is drained from the tray 106 via the reservoir 183 as shown. In this manner, any small portion of water in the tray 106 that is not siphoned through the siphon drain 158 is collected in the reservoir 183 away from the seed, which helps to prevent any oversoaking of the seed. The unsiphoned water in the reservoir 183 can then be drained via one or more weep holes 181, which can be formed in a bottom surface of the reservoir 183. Alternatively, in other examples, one or more weep holes 181 can be formed in the stand pipe 168 at a location near the bottom surface of the reservoir 183, such that unsiphoned water in the reservoir 183 can be drained through the stand pipe 168 via the weep hole(s) 181 formed in the stand pipe 168. In certain examples, the domed housing 166 of the siphon drain 158 of FIG. 11C is generally cylindrical shaped, and the domed housing 166 of the siphon drain 158 of FIG. 11A is generally conical shaped or frusto-conical shaped. However, in other examples, the domed housing 166 can have any of various shapes other than those shown in FIGS. 11A and 11C.

Figure 12B:
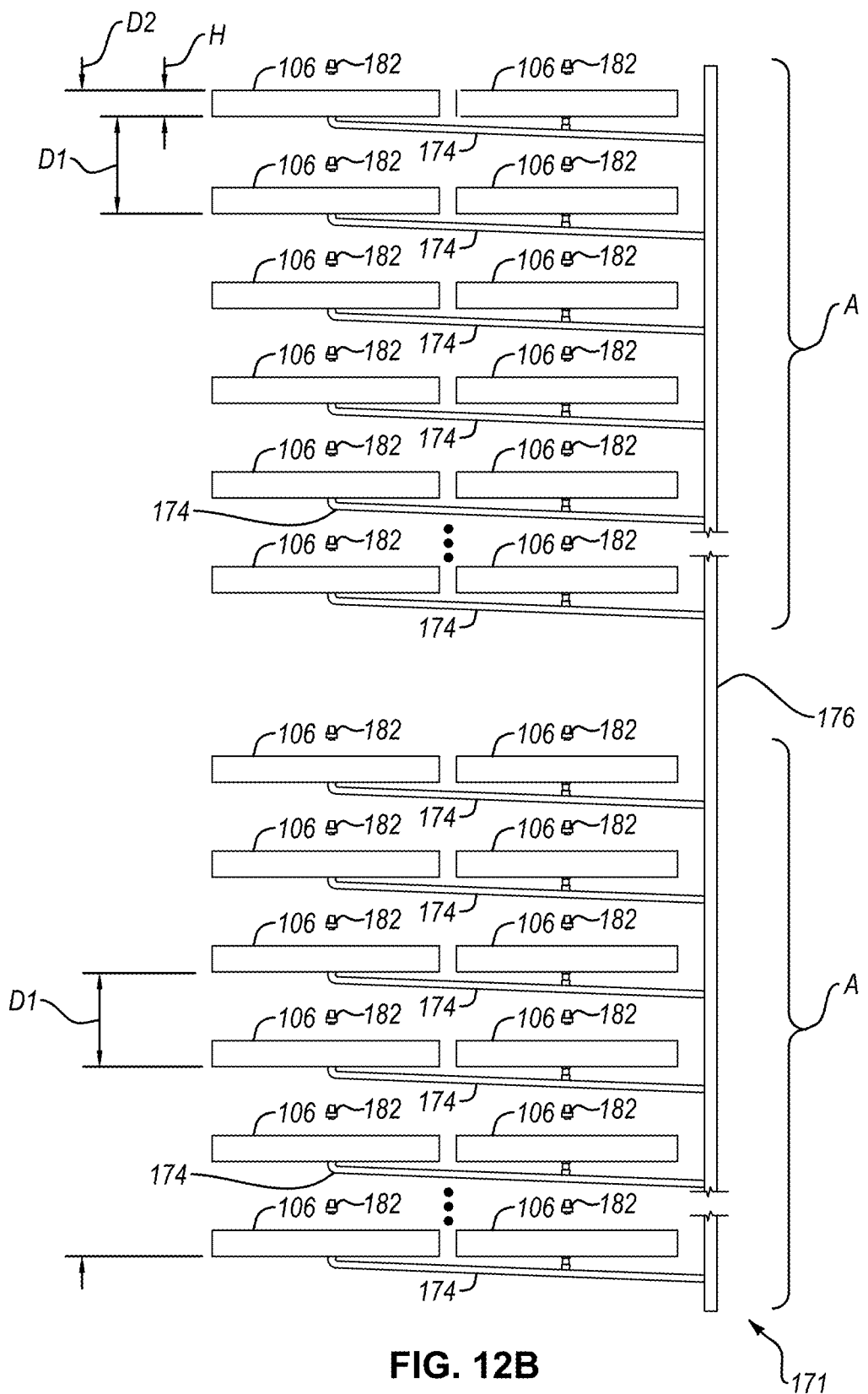
FIG. 12B is a side elevation view of a watering system, a drainage system, and a lighting system of a rack of a system for growing and harvesting living matter, according to one or more examples of the present disclosure.

Referring to FIG. 12B, in some examples described in this paragraph, the trays 106 of a given column 153 can be grouped together such that each group of trays 106 has a predetermined quantity of consecutive trays. For example, in FIG. 12B, the trays 106 of the illustrated column of trays are grouped into two Group A groupings. Each group A grouping has the same quantity of trays 106. Although the illustrated example shows six trays 106 per grouping, in other examples, as indicated by the ellipsis dots, each grouping can have fewer than six trays 106 or more than six trays 106 (e.g., between twelve and twenty-four trays). The watering system 182 and the drainage system 171 of Group A corresponds with that shown in FIG. 12A. In other words, each tray 106 in each Group A grouping has its own water inlet line and the two trays 106 of every shelf have their own shelf drainage pipe 174. Accordingly, the watering system 182 of FIG. 12B has a quantity of water inlet lines equal to the quantity of the trays 106 and the drainage system 171 has a quantity of shelf drainage pipes 174 equal to one half the quantity of the trays 106. Water drained from every tray 106 first flows into a corresponding one of multiple shelf drainage pipes 174 and water from all the shelf drainage pipes 174 drains into the rack drainage pipe 176.

Also shown in FIG. 12B are dimensions that correlate with the number of trays per unit height of a given column of trays. Maximizing the number of trays per unit height is desirable because it correlates to maximizing the volume of feed produced within a given volume of space, which is a desirable output of the system. The number of rows of trays in a given column can be limited by structure, such as water inlet lines and shelf drainage lines, between the rows of trays 106. In FIG. 12B, for example, because each row of trays includes a dedicated shelf drainage pipe 174 and a dedicated water inlet line, there is a drainage pipe and a water inlet line between adjacent rows of trays 106 within the column. The presence of the shelf drainage pipes 174 and the water inlet lines between the rows results in a first minimum distance D1 between adjacent rows of trays within the column depicted in FIG. 12B. The first minimum distance D1 is the smallest distance from a reference point on one tray 106 of a row to a reference point (e.g., the same reference point) on the tray 106 of an adjacent row. In FIG. 12B, the first minimum distance D1 corresponds with the smallest distance from the bottom of the tray 106 in one row to the bottom of the tray 106 in the next adjacent row. A total distance D2 is defined as the distance between an uppermost tray of a column to a lowermost tray of the column of groupings of trays grouped according to Group A. The total distance D2 is dependent on the first minimum distance D1 and the number of rows in the column. Accordingly, for a given number of rows of trays 106 each having a given height H, the smallest the total distance D2 can be, and thus the highest the volume of feed produced per unit volume of space, is limited by the first minimum distance D1.

Figure 12C:
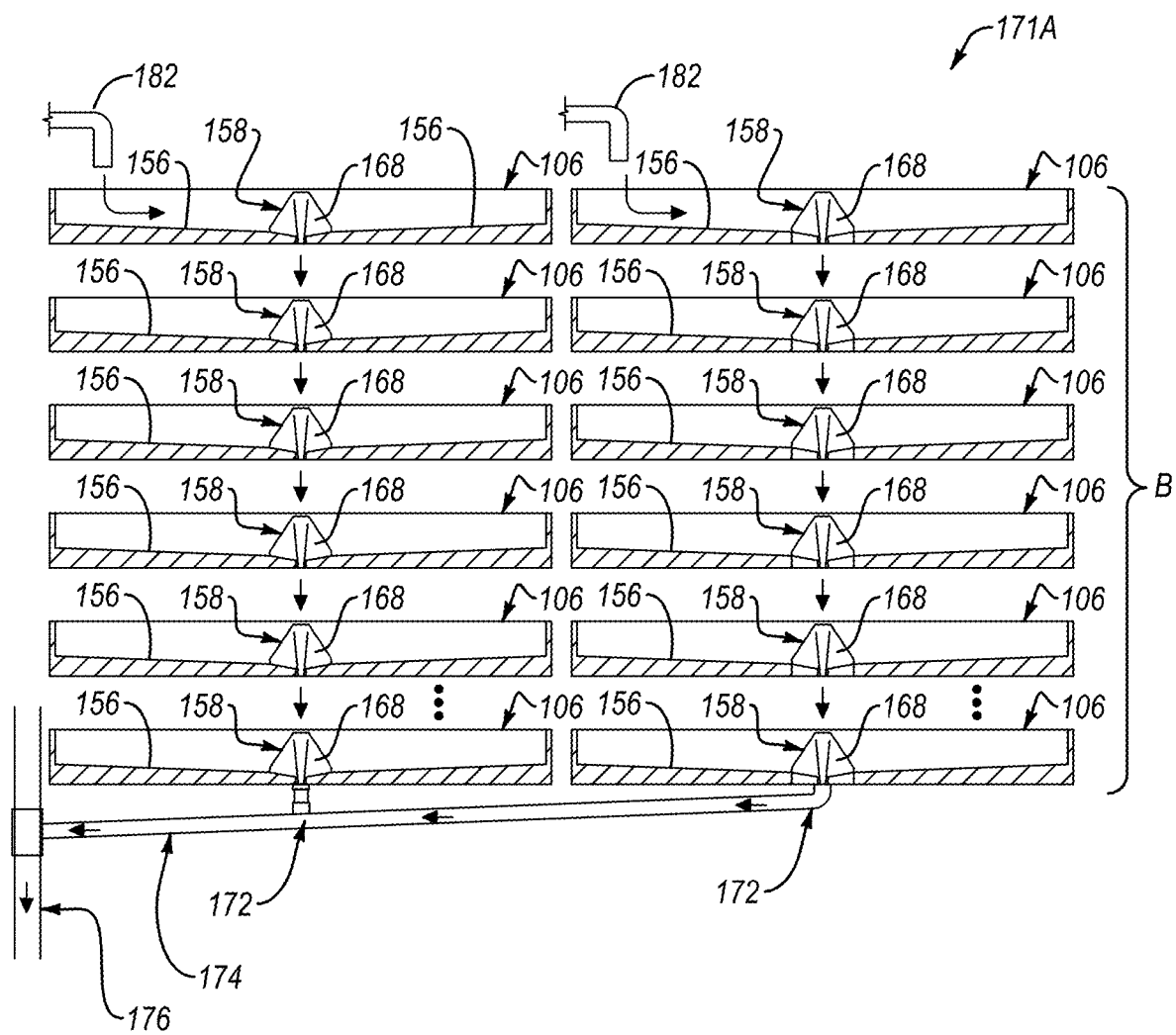
FIG. 12C is a side elevation view of a watering system, a drainage system, and a lighting system of a rack of a system for growing and harvesting living matter, according to one or more examples of the present disclosure.

Referring to FIG. 12C, according to alternative examples described in this paragraph, the trays 106 of a Group B of trays are similar to the trays 106 of FIG. 12A and the trays 106 of Group A of FIG. 12B. However, unlike Group A, each tray 106 of Group B does not have its own water inlet line and each row of trays 106 of Group B does not have its own shelf drainage pipe 174. Rather, in these examples, the drainage system 171A has only one shelf draining pipe 174 for all the trays 106 of Group B, and there is only one water inlet line for all the trays 106 within the same column of trays 106 of Group B. After the trays 106 are seeded and delivered into the designated tray storage position on one of the racks 104 by the robot 108 to form the Group B of trays 106, water, from a water inlet line, is delivered into an uppermost tray 106 of each column of trays within Group B. Because Group B has two columns of trays 106, there are two water inlet lines each corresponding with a different one of the columns of trays. Although the illustrated example shows six trays 106 per Group A and Group B, in other examples, as indicated by the ellipsis dots, each grouping can have fewer than six trays 106 or more than six trays 106 (e.g., between twelve and twenty-four trays).

As water in an uppermost tray 106 reaches a certain level, the water begins to drain from the uppermost tray 106 via the siphon drain 158 of the uppermost tray 106. However, unlike the configuration of Group A, instead of draining from the uppermost tray 106 into a shelf drainage pipe 174, the water from the uppermost tray 106 is drained directly into a first adjacent tray 106 below the uppermost tray 106. Then, as water in the first adjacent tray 106 reaches a certain level, the water begins to drain through the first adjacent tray's siphon drain 158 into a second adjacent tray 106 below the first adjacent tray 106. The pattern of filling a tray 106 with a certain level of water and then draining excess water to the next adjacent tray 106, below that tray, continues until the water fills a lowermost tray 106 to a certain level and the excess water drains from the lowermost tray 106 via the siphon drain 158 and the coupling 172 to the shelf drainage pipe 174 associated with Group B. In this manner, water introduced at the top of Group A of trays 106 cascades downwardly from tray-to-tray until it drains into a rack drainage pipe 176. In certain examples, the rate of water added to the uppermost tray 106 by the water inlet line is a first rate (e.g., 18 gallons/hour) and the rate of water drained from one tray to the next is at a second rate (e.g., 12 gallons/hour or about two-thirds the first rate), which is lower than the first rate.

Figure 12D:
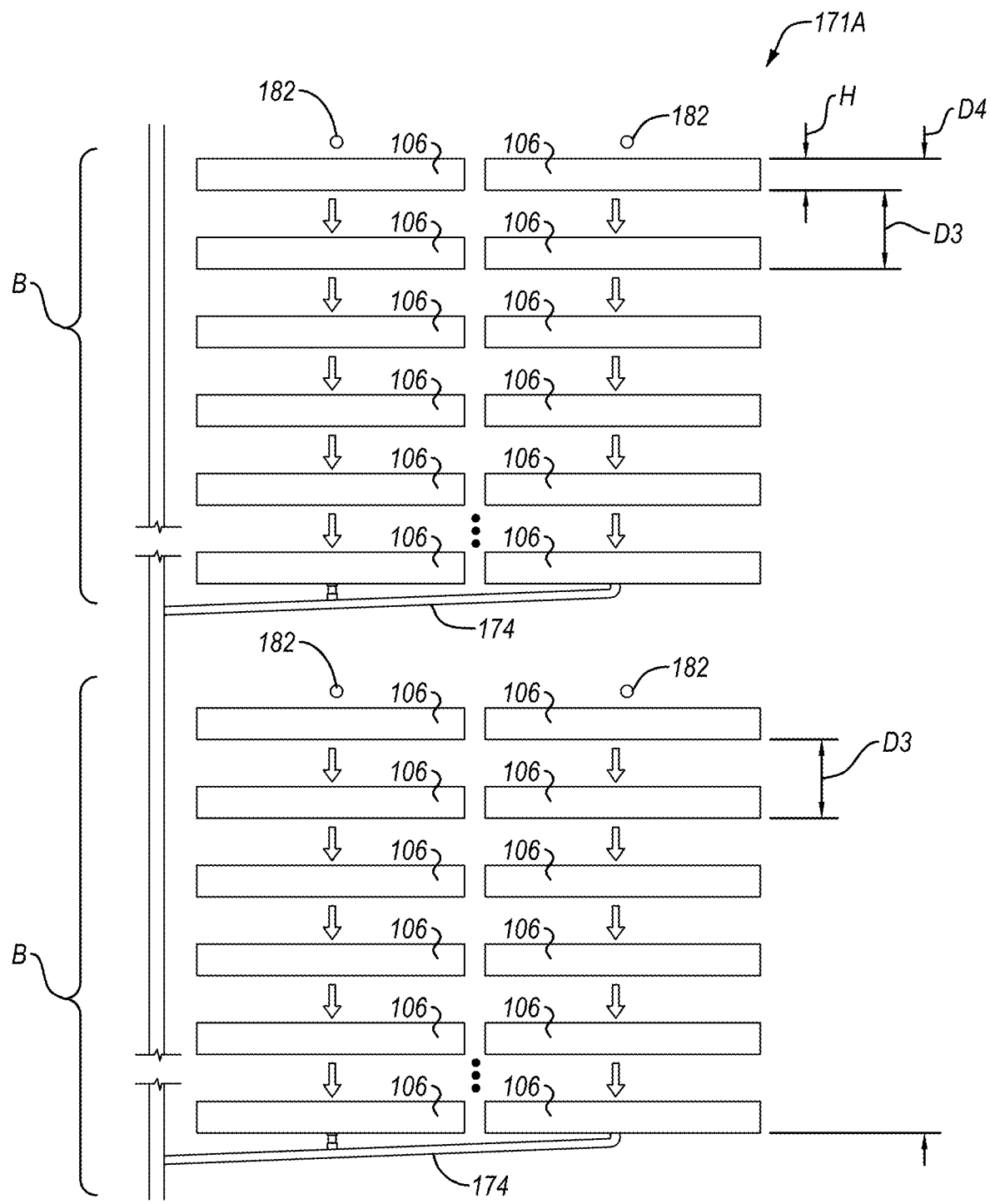
FIG. 12D is a side elevation view of a watering system, a drainage system, and a lighting system of a rack of a system for growing and harvesting living matter, according to one or more examples of the present disclosure.

In some examples, instead of the watering system 182 of FIGS. 12C and 12D having a single water inlet line for each column of trays of each group that fills only the uppermost tray of the column (and lower trays are watered only when water from upper trays are drained via siphons), the water system 182 can have a water inlet line for each one of the trays in each column of trays, which is similar to the water system 182 of FIG. 12B. According to one example of a watering schedule, every tray 106 is filled with water to a level that does not trigger drainage of water via the siphon drains 158. In other words, the seeds of the trays 106 are allowed to soak for a period of time without any cascading of water from one tray to the next as described above. After the period of time has expired, the watering schedule includes adding water to only the uppermost trays of the columns such that the siphon drains 158 of the uppermost trays are triggered and water drains into the next adjacent trays below the uppermost trays. In this manner, the water drained from the uppermost trays triggers a cascading event such that all the trays are drained of water. Although not shown, the trays of the groups of trays of FIGS. 12C and 12D can include one or more weep holes in the grow surfaces 156 of the trays 106 (see, e.g., the weep hole 181 of FIG. 11C) such that water not drained via the siphoning effect of the siphon drains 158 will eventually drain from the trays 106 via the weep holes.

Referring to FIG. 12D, dimensions that correlate with the number of trays per unit height of a given column of trays in Group B are shown. According to the configuration of Group B, because, with the drainage system 171A, each row of trays does not include a dedicated shelf drainage pipe 174 nor a dedicated water inlet line, there is not a drainage pipe and a water inlet line between adjacent rows of trays 106 within the column. The absence of the shelf drainage pipes 174 and the water inlet lines between the rows results in a second minimum distance D3 between adjacent rows of trays that can be (and is in the illustrated example) smaller than the first minimum distance D1 associated with the configuration of Group A. The second minimum distance D3 is defined in the same way as the first minimum distance D1. A total distance D4 is defined as the distance between an uppermost tray 106 of a column to a lowermost tray 106 of a column of groupings of trays grouped according to Group B. Because the second minimum distance D3 can be less than the first minimum distance D1, for the same number of trays 106 having the same height H, the total distance D4 can be less than the total distance D2. Accordingly, for a given number of rows of trays 106 each having a given height H, the volume of feed produced per unit volume of space for the trays grouped according to Group B is greater than for Group A.

Although, in the illustrated examples, the racking portion 110 includes a drainage system, so that seeds for generating plants are not oversoaked, in other examples, the racking portion 110 does not include a drainage system to promote soaking of the seeds. For example, when the seeds are insect eggs, the eggs should be soaked for prolonged periods of time to promote growth of larvae.

In some examples, the electronic controller 103 controls the watering of the trays 106 according to a predetermined watering program. The predetermined watering program defines watering parameters, such as frequency of watering cycles, rate of water supplied to the trays 106, duration of each watering cycle, and/or the like. In some examples, the electronic controller 103 controls the watering of the trays 106 according to one or more different predetermined watering programs, such as based on the vertical location of the trays, the type of feed being grown, and/or the like. Moreover, according to certain examples, the electronic controller 103 is configured to control the watering of one grouping of trays within a column according to a first watering program and another grouping of trays within the same column according to a second watering program that is different than the first watering program. In some environments, the heat and/or humidity in a space, within which a column of multiple groupings of trays are located, can vary based on the vertical location of the groupings of trays. For example, in an enclosed space, the temperature and humidity of air can be higher at higher elevations. Accordingly, seed in trays of groupings at higher elevations within a space may require less watering than the same type of seed in trays of groupings at lower elevations. Accordingly, in certain examples, such as with FIGS. 12B and 12D, the watering program for the higher grouping of the Group A groupings is different (e.g., lower frequency, lower water rate, lower watering duration) than the watering program for the lower grouping of the Group A groupings, and the watering program for the higher grouping of the Group B groupings is different (e.g., lower frequency, lower water rate, lower watering duration) than the watering program for the lower grouping of the Group B groupings.

In some examples, as shown in FIG. 10, the trays 106 are self-supporting. For example, the tray 106 includes a plurality of external ribs 160 formed in the bottom surface of the tray 106. The ribs 160 help to stiffen and strengthen the tray 106 so that when filled with seed and water, the tray 106 is capable of supporting the seed and water on its own, without supplemental underlying support from external objects. Accordingly, the shelves 144 of the racks 104 retain the trays 106 in place and do not need to supply load-carrying support to the trays 106, which would demand additional complexity, cost, and/or bulk to the racks 104.

Referring back to FIG. 12A, after the tray 106 is seeded and watered, and after a predetermined germination period, artificial light can be directed to the germinated seeds via one or more light sources 180 of a lighting system 173 of the racking portion 110. In some examples, the light sources 180 are incorporated into the racks 104 so that each one of the designated tray storage positions includes a corresponding one or more of the light sources 180. The light sources 180 are individually electrically controlled by the electronic controller 103 to activate after a predetermined germination period has been reached for each tray 106, and deactivate after a predetermined period of time, such as when the feed has reached growth sufficient for harvesting. According to some examples, the system 100 does not rely on artificial light and thus does not include the lighting system 173. Alternatively, the system 100 can include limited use of the lighting system 173, such as exposing the seed/living matter to just enough of the artificial light to promote growth (if at all) until at least after the energy within the seed has been substantially exhausted. In certain examples, some seed, such as wheatgrass seed, has sufficient energy and/or nutrients to grow for up to 8 or more days without artificial light, after which at least some artificial light can be applied to or not applied to the seed to promote further growth.

It is recognized that in some examples each tray 106 remains in the same tray storage position in which it was delivered until the tray 106 is ready for harvesting. However, in other examples, if desired, one or more of the trays 106 can be moved from one storage position to another storage position by the robot 108 after deliver of the tray to an initial storage position and before the tray 106 is ready for harvesting.

In certain examples, when the electronic controller 103 determines that feed in a seeded-watered tray 106A on a rack 104 is ready for harvesting, the tray 106 is in a fully-grown feed state (i.e., feed-ready tray 106B) and the electronic controller 103 controls the robot 108 to retrieve the feed-ready tray 106B from its designated tray storage position on the rack 104, and deliver the feed-ready tray 106B to the outfeed staging zone 114. As used herein, fully grown means grown to a desired level for harvesting. Accordingly, fully grown does not mean fully developed plants, but can be recently sprouted or recently germinated seeds, fully developed plants, or plants in any of various stages between recently sprouted and fully developed. For efficiency, in some examples, the robot 108 retrieves feed-ready trays 106B two at a time and delivers two feed-ready trays 106B to the outfeed staging zone 114 at the same time.

Referring to FIGS. 13 and 15, in certain examples described in this paragraph, the tray 106 includes engagement features that help facilitate engagement between the robot 108 and the trays 106, when delivering and retrieving the trays 106, to help facilitate engagement between the trays 106 and the shelves 144, when being inserted into or removed from the shelves, and/or to help facilitate conveyance of the trays 106 along the one or more conveyors of the system 100. The engagement features can include side slots 184 or channels formed in at least two opposing ones of the sides of the trays 106 and/or bottom slots 186 or channels formed in the closed bottom of the trays 106.

From the outfeed staging zone 114, a conveyor can separately convey each one of the feed-ready trays 106B to the harvester 116. In some examples, the harvester 116 includes an inline-scale, which weighs the feed-ready tray 106B to determine the weight of the feed in the feed ready tray 106B. After weighing the feed-ready tray 106B, the harvester 116 includes means from removing the feed from the feed-ready tray 106B and dispensing feed onto the feed conveyor 126. In some examples, the feed conveyor 126 conveys the feed to the feed lot 136 in preparation for consumption by animals. In certain examples, the feed conveyor 126 conveys the feed through a chopper 135, before delivering the feed to the feed lot 136.

In some examples, the harvester 116 includes a mechanism for tilting or at least partially flipping over the feed-ready tray 106B so that the feed in the tray slides out of the tray and onto the feed conveyor 126. According to certain examples, the grow surface 156 of the tray 106 is smoothed so that the feed more easily slides out of the tray when the tray is tilted by the harvester 116. The harvester 116 can alternatively, or additionally, include a sweeping or scooping mechanisms that moves through the feed-ready tray 106B to urge the feed out of the tray. After the feed is removed from the feed-ready tray 106B, the tray 106 is in an empty and soiled state (i.e., empty-soiled tray 106C).

The empty-soiled tray 106C is then conveyed to the cleaner 118, which removes any debris remaining in the tray, in various examples. According to some examples, the cleaner 118 can include any of various industrial-sized dishwashers, such as conveyor dishwashers. In certain examples, the cleaner 118 includes a dryer configured to dry the trays 106 after being cleaned. After the trays 106 are cleaned, the trays 106 are in a cleaned state (i.e., cleaned tray 106D). The clean tray 106D is conveyed to the tray setter 120, which reorients the clean tray 106D into a position and orientation onto a conveyor ready to receive seed. In this position and orientation, the clean tray 106D becomes the clean-empty tray 106E, which is again passed through the system 100 so the tray 106 can be reused for an additional cycle of growing and harvesting animal feed. In this manner, according to certain examples, each one of the trays 106 is repeatedly processed through the system 100 for repeated growing and harvesting of animal feed.

In some examples described in this paragraph, the system 100 accounts for and individually processes thousands of trays 106 at a time for growing and harvesting feed. Each tray 106, or each one of multiple pairs of trays 106, is repeatedly processed through the system 100 at different times relative to any other tray 106, or any other pair of the multiple pairs of trays 106. In some examples, the system 100 harvests feed from trays 106 during a daily harvesting period, which, in some examples, and not intended to be limiting in any way, is at least 7.5 hours (e.g., between 4 AM and 11:30 AM). In one particular example, the system 100 can be configured to harvest feed from at least 640 trays per harvesting period per sub-system 102. Accordingly, in this particular example, the robot 108 can be capable of moving at least 84 trays per hour (if one at a time) or at least 168 trays per hour (if two at a time) out of the outfeed staging zone 114 and into the infeed staging zone 124. In some examples, the system 100 is capable of harvesting at least 60,000 pounds of feed per day. It is recognized that the above examples are merely some of many examples of a daily harvesting period and schedule that can be achieved with the subject matter of the present disclosure. The electronic controller 103 keeps track of each tray, where it is in the process, and when it should be moved to the next step of the process. Moreover, the electronic controller 103 is preprogrammed to move each tray 106 through the system 100 according to a predetermined schedule.

In some examples described in this paragraph, and as shown in FIGS. 6-8, each rack 104 includes multiple columns 153 of multiple sets of multiple shelves 144. According to the illustrated example, each rack 104 includes eight columns 153 each having six sets of five shelves 144. However, in other examples, each rack 104 can include fewer or more than eight columns 153, where each column 153 has fewer or more than six sets of shelves 144, and each one of the sets of shelves 144 can include fewer or more than five shelves 144. In the illustrated example, the five shelves 144 of each set are physically grouped together to promote efficient movement of the robot 108. Moreover, each set of shelves 144 is associated with a different harvesting period. For example, each column 153 of the rack 104 includes a first set of shelves 142A, associated with a first day of harvesting, a second set of shelves 142B, associated with a second day of harvesting, a third set of shelves 142C, associated with a third day of harvesting, a fourth set of shelves 142D, associated with a fourth day of harvesting, a fifth set of shelves 142E, associated with a fifth day of harvesting, and a sixth set of shelves 142F, associated with a sixth day of harvesting. As mentioned above, although six sets of shelves are shown, the rack 104 can include more or less than six sets of shelves, and each set can include more or less than five shelves 144 depending on the desired feed output and desired footprint or height of the system 100.

According to one predetermined schedule described in this paragraph, the system 100 initiates the process by delivering seeded trays 106F, from the infeed staging zone 124, to and filling the shelves 144 of the first set of shelves 142A. Once delivered to a shelf 144, the seeded trays 106F are quickly watered. In certain examples, some of the seeded trays 106F delivered to the first set of shelves 142A are fully watered or in the process of being watered as other ones of the seeded trays 106F are delivered to the first set of shelves 142A. In other words, the germination and growing of the seeds in the seeded trays 106F delivered to the first set of shelves 142A occurs in a staggered manner according to when the trays were delivered to the shelves, in some examples. The second set of shelves 142B, the third set of shelves 142C, the fourth set of shelves 142D, the fifth set of shelves 142E, and the sixth set of shelves 142F are subsequently and consecutively filled with seeded trays 106F and watered in the same manner as with the first set of shelves 142A. Because the seeded trays 106F of the first set of shelves 142A were watered before the seeded trays 106F of the other sets of shelves, the feed of the seeded trays 106F of the first set of shelves 142A can be ready for harvesting before the other sets of shelves.

In some examples described in this paragraph, the watering of each tray 106 is performed in multiple timed stages. For example, in one implementation, and for illustrative purposes only, during an initial period (e.g., the first 24 hours) after the tray 106 is delivered to the rack 104, it is filled with water to soak the seed for a first period of time (e.g., 12 hours) and the water is drained. Then, according to the one implementation, during another period (e.g., the first 24-120 hours) after the tray 106 is delivered to the rack 104, water is added to the tray 106 to flood the root mat and then the tray is drained every few hours (e.g., 10-12 hours). According to the one implementation, during another period (e.g., the first 120-144 hours) after the tray 106 is delivered to the rack 104, water is added to the tray 106 to flood the root mat and then the tray is drained once between yet another period (e.g., the 120-130 hours) after the tray 106 is delivered. Finally, in the one implementation, the tray 106 is exposed to light for a further period (e.g., the next 24 hours), after which the tray 106 is ready for harvesting. It is recognized that the above implementation is merely one example of many possible examples of how watering of the trays can be achieved with the subject matter of the present disclosure.

In some examples described in this paragraph, the day after filling the sixth set of shelves 142F with seeded trays 106F and watering those trays, the seeded trays 106F of the first set of shelves 142A are ready for harvesting. Accordingly, the robot 108 retrieves the feed-ready trays 106B from the first set of shelves 142A and delivers them to the outfeed staging zone 114 for further processing during the harvesting period on the day after delivering the seeded trays 106F to the sixth set of shelves 142F. In addition to harvesting the trays 106 from the first set of shelves 142A during the harvesting period, the system 100 also cleans, sets, seeds, and delivers the harvested trays back to the first set of shelves 142A as seeded trays 106F. The trays from the remaining set of shelves are consecutively harvested, re-seeded and delivered back to the shelves during the harvesting period on each consecutive day thereafter. Then, the process repeats itself such that trays are continuously harvested and seed is continuously grown every day during operation of the system 100. Although the timing of the above process steps is based on a daily schedule, it is recognized that the process can be run and repeated according to any desired time frame other than a 24-hour period. Moreover, although the above examples described six sets of shelves, where the trays of a given set of shelves are harvested six days after the trays are delivered to the given set of shelves (i.e., resulting in a harvesting period of six days). However, in other examples the harvesting period for the seeds of any given tray in any given set of shelves can be less than six days (e.g., 2-5 days) or more than six days, such as seven days or more. The harvesting period can be determined based on any of various factors, such as seed type, watering schedule, lighting schedule, environmental conditions, and/or the like.

Figure 19:
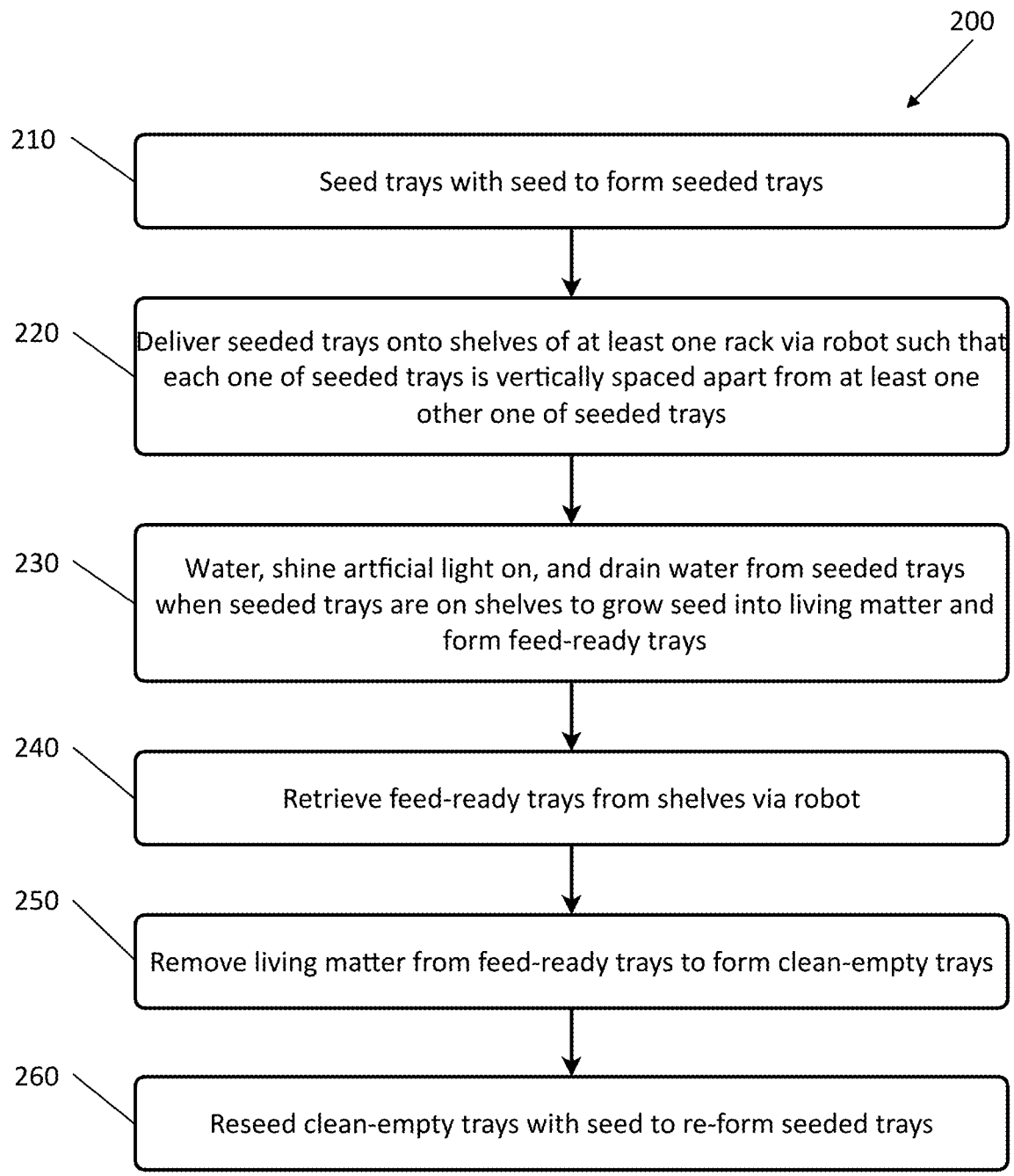
FIG. 19 is a schematic flow chart of a method of autonomously growing and harvesting living matter, according to one or more examples of the present disclosure.

Referring to FIG. 19, according to one example, a method 200 of autonomously growing and harvesting living matter, such as animal feed, is shown. The method can be practiced using the system 100 described above or other similar systems. Accordingly, features utilized in the method 200 can be the features of the same name of the system 100, or features of another similar system. The method 200 includes (block 210) seeding seed trays with seed to form seeded trays and (block 220) delivering the seeded trays onto shelves of at least one rack via a robot, such that each one of the seeded trays is vertically spaced apart from at least one other one of the seeded trays. The method 200 also includes (block 230) watering, optionally shining artificial light on, and draining water from the seeded trays when the seeded trays are on the shelves to grow the seed into living matter and form feed-ready trays. The method 200 further includes (block 240) retrieving the feed-ready trays from the shelves via the robot and (block 250) removing the living matter from the feed-ready trays to form clean-empty trays. The method 200 additionally includes (block 260) reseeding the clean-empty trays with seed to re-form the seeded trays.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

The term "about" or "substantially" in some embodiments, is defined to mean within +1-5% of a given value, however in additional embodiments any disclosure of "about" may be further narrowed and claimed to mean within +/−4% of a given value, within +/−3% of a given value, within +/−2% of a given value, within +/−1% of a given value, or the exact given value. Further, when at least two values of a variable are disclosed, such disclosure is specifically intended to include the range between the two values regardless of whether they are disclosed with respect to separate embodiments or examples, and specifically intended to include the range of at least the smaller of the two values and/or no more than the larger of the two values. Additionally, when at least three values of a variable are disclosed, such disclosure is specifically intended to include the range between any two of the values regardless of whether they are disclosed with respect to separate embodiments or examples, and specifically intended to include the range of at least the A value and/or no more than the B value, where A may be any of the disclosed values other than the largest disclosed value, and B may be any of the disclosed values other than the smallest disclosed value.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The electronic controller and any associated modules described in this specification may be implemented as a hardware circuit comprising custom VLSI circuits or gate arrays, off-the-shelf semiconductors such as logic chips, transistors, or other discrete components. The electronic controller may also be implemented in programmable hardware devices such as field programmable gate arrays, programmable array logic, programmable logic devices or the like.

The electronic controller may also be implemented in code and/or software for execution by various types of processors. An identified module of code may, for instance, comprise one or more physical or logical blocks of executable code which may, for instance, be organized as an object, procedure, or function. Nevertheless, the executables of the electronic controller need not be physically located together, but may comprise disparate instructions stored in different locations which, when joined logically together, comprise the electronic controller and achieve the stated purpose for the electronic controller.

Indeed, code of the electronic controller may be a single instruction, or many instructions, and may even be distributed over several different code segments, among different programs, and across several memory devices. Similarly, operational data may be identified and illustrated herein within the electronic controller, and may be embodied in any suitable form and organized within any suitable type of data structure. The operational data may be collected as a single data set, or may be distributed over different locations including over different computer readable storage devices. Where the electronic controller or portions of the electronic controller are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the above description, numerous specific details are provided, which can include examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of some examples are described above with reference to schematic flowchart diagrams and/or schematic block diagrams of methods, apparatuses, systems, and program products according to examples. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The present subject matter may be embodied in other specific forms without departing from its spirit or essential characteristics. The described examples are to be considered in all respects only as illustrative and not restrictive. Examples of the scope of the present subject matter can be found in the following numbered paragraphs.

What is claimed is:

1. A system for growing and harvesting living matter, the system comprising:
    trays;
    a racking portion, comprising:
        two racks separated by an aisle where each one of the two racks has shelves vertically spaced apart from each other; and
        a robot selectively operable to deliver the trays to and retrieve the trays from the shelves, wherein the robot comprises:
            a lower horizontal track in the aisle, parallel to the aisle, and non-movably fixed relative to the two racks;
            an upper horizontal track in the aisle, parallel to the aisle, and non-movably fixed relative to the two racks;
            a vertical track perpendicular to and selectively movable along the lower horizontal track and the upper horizontal track in only forward and rearward directions parallel to the aisle; and
            a motorized vertical carriage selectively movable along the vertical track in only upward and downward directions perpendicular to the forward and rearward directions, wherein the motorized vertical carriage is configured to support at least one tray at a time so that the at least one tray co-moves with the motorized vertical carriage;
    a processing portion, comprising;
        a harvester configured to receive the trays from the shelves and to remove living matter from the trays; and
        a seeder configured to receive the trays from the harvester and to distribute seed to the trays; and
    an electronic controller operable to autonomously control operation of the robot to deliver each one of the trays, after seeded by the seeder and before the seed is germinated, to a corresponding one of a plurality of storage positions on the shelves and to retrieve each one of the trays, when the seed has grown into the living matter, from the corresponding one of the plurality of storage positions on the shelves,
    wherein each one of the trays, after being delivered to the corresponding one of the plurality of storage positions on the shelves and before being retrieved from the corresponding one of the plurality of storage positions on the shelves, remains in and does not move from the corresponding one of the plurality of storage positions on the shelves until the seed in the corresponding one of the trays has grown into the living matter.

2. The system according to claim 1, wherein the motorized vertical carriage is selectively movable along at least one of the vertical track and the aisle to deliver the trays to and retrieve the trays from the shelves of either of the two racks at any of various locations along the aisle.

3. The system according to claim 1, wherein the robot is selectively operable to vertically raise or lower the trays, to deliver the trays to and retrieve the trays from any one of the shelves, and to horizontally move the trays, to deliver the trays to and retrieve the trays from any one of multiple tray storage positions along the shelves.

4. The system according to claim 1, wherein the robot comprises an automated storage and retrieval system robot.

5. The system according to claim 1, wherein:
    the processing portion further comprises a conveyor selectively operable to convey the trays;
    the harvester is configured to receive the trays from the shelves via the conveyor;
    the seeder is configured to receive the trays from the harvester via the conveyor; and
    the electronic controller is operable to autonomously control operation of the conveyor to convey the trays from the robot to the harvester, from the harvester to the seeder, and from the seeder to the robot.

6. The system according to claim 5, wherein:
    the processing portion further comprises a cleaner configured to receive the trays from the harvester via the conveyor;
    the seeder is configured to receive the trays from cleaner via the conveyor; and
    the electronic controller is operable to autonomously control operation of the conveyor to convey the trays from the harvester to the cleaner and to convey the trays from the cleaner to the seeder.

7. The system according to claim 1, wherein the robot delivers each one of the trays to a corresponding one of multiple tray storage positions on the shelves and retrieves each one of the trays from the corresponding one of the multiple tray storage positions on the shelves.

8. The system according to claim 7, wherein the racking portion comprises a watering system, comprising water inlet lines each associated with a corresponding one of the multiple tray storage positions to deliver water to a corresponding one of the trays in the corresponding one of the multiple tray storage positions.

9. The system according to claim 7, wherein each one of the trays comprises a passive drainage device configured to drain water from the tray.

10. The system according to claim 7, wherein the racking portion comprises a watering system, comprising a water inlet line associated with a vertical grouping of trays to deliver water to only an uppermost tray of the vertical grouping of trays.

11. The system according to claim 10, wherein:
    each one of the trays comprises a passive drainage device configured to drain water from the tray;
    the watering system further comprises a drainage system, comprising a drainage line in fluidic communication with the passive drainage device of a lowermost tray of the vertical grouping of trays; and
    the passive drainage device of the trays of the vertical grouping of trays, except for the lowermost tray of the vertical grouping of trays, is configured to drain water from a corresponding one of the trays to a corresponding adjacent one of the trays below the corresponding one of the trays.

12. The system according to claim 7, wherein:
    the racking portion comprises a watering system;
    the trays are grouped into a first grouping of trays and a second grouping of trays vertically offset from the first grouping of trays; and
    the electronic controller is configured to deliver water to the first grouping of trays according to a first watering program and to deliver water to the second grouping of trays according to a second watering program that is different than the first watering program.

13. The system according to claim 1, wherein:
the system comprises multiple racking portions and multiple processing portions;
the system further comprises multiple sub-systems; and
each one of the sub-systems comprises a corresponding one of the racking portions and a corresponding one of the processing portions.

14. The system according to claim 1, wherein:
the racking portion comprises two racks; and
the shelves of the two racks are configured to store at least 3,840 trays at one time.

15. The system according to claim 1, wherein each one of the shelves of the racking portion is configured store the trays in a two-deep configuration.

16. The system according to claim 1, further comprising a mister between the seeder and the at least one rack, wherein the mister is configured to mist the seed in the trays with water before the robot delivers the trays to the shelves.

17. A method of autonomously growing and harvesting living matter, the method comprising:
seeding trays with seed to form seeded trays;
delivering each one of the seeded trays to a corresponding one of a plurality of storage positions on shelves of at least one rack via a robot such that each one of the seeded trays is vertically spaced apart from at least one other one of the seeded trays;
watering and draining water from the seeded trays when the seeded trays are on the shelves to grow the seed into living matter and form feed-ready trays;
retaining the seeded trays on the shelves until the seed has grown into the living matter and the seeded trays become feed-ready trays;
retrieving each one of the feed-ready trays from the corresponding one of the plurality of storage positions on the shelves via the robot, wherein each one of the seeded trays and the feed-ready trays remains in and does not move from the corresponding one of the plurality of storage positions on the shelves until the seeded trays become the feed-ready trays, wherein each one of delivering each one of the seeded trays via the robot and retrieving each one of the feed-ready trays via the robot comprises:
moving a motorized vertical carriage, while the motorized vertical carriage supports a corresponding one of a seeded tray or a feed-ready tray, along a vertical track in only one or both of an upward direction and a downward direction; and
moving the vertical track along a lower horizontal track and an upper horizontal track in only one or both of a forward direction or a rearward direction, wherein the lower horizontal track and the upper horizontal track are non-movably fixed relative to the at least one rack;
removing the living matter from the feed-ready trays to form clean-empty trays; and
reseeding the clean-empty trays with seed to re-form the seeded trays.

18. The method according to claim 17, wherein, during a harvesting period, the robot continuously alternates between delivering at least one of the seeded trays onto the shelves and retrieving at least one of the feed-ready trays from the shelves.

19. The method according to claim 18, wherein, during the harvesting period, the robot continuously alternates between delivering at least two of the seeded trays onto the shelves and retrieving at least two of the feed-ready trays from the shelves.

20. The method according to claim 17, further comprising:
conveying, via an automated conveyor, the feed-ready trays to a harvester that removes the living matter from the feed-ready trays; and
conveying, via the automated conveyor, the clean-empty trays to a seeder that re-seeds the clean-empty trays;
wherein one of the feed-ready trays is conveyed to the harvester and one of the clean-empty trays is conveyed to the seeder concurrently with at least one of the seeded trays being delivered to or at least one of the feed-ready trays being retrieved.

21. The method according to claim 17, wherein seeding the trays, delivering the seeded trays, watering and draining water from the seeded trays, retrieving the feed-ready trays, removing the living matter from the feed-ready trays, and reseeding the clean-empty trays is performed autonomously without manual intervention.

* * * * *